US010193666B2

(12) United States Patent
Liang et al.

(10) Patent No.: US 10,193,666 B2
(45) Date of Patent: Jan. 29, 2019

(54) METHOD, ACCESS POINT, SERVER AND STATION USED FOR COORDINATED TRANSMISSION

(71) Applicant: Huawei Technologies Co., Ltd., Shenzhen (CN)

(72) Inventors: Yongming Liang, Shenzhen (CN); Jiayin Zhang, Shenzhen (CN); Yi Luo, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 373 days.

(21) Appl. No.: 14/932,619

(22) Filed: Nov. 4, 2015

(65) Prior Publication Data
US 2016/0080124 A1 Mar. 17, 2016

Related U.S. Application Data

(63) Continuation of application No. PCT/CN2013/087464, filed on Nov. 20, 2013.

(30) Foreign Application Priority Data

May 7, 2013 (CN) .......................... 2013 1 0163391

(51) Int. Cl.
*H04W 28/02* (2009.01)
*H04L 5/00* (2006.01)
(Continued)

(52) U.S. Cl.
CPC .......... *H04L 5/0035* (2013.01); *H04B 7/024* (2013.01); *H04W 24/10* (2013.01); *H04W 72/085* (2013.01); *H04W 72/1278* (2013.01)

(58) Field of Classification Search
CPC ... H04W 28/0221; H04W 4/70; H04W 76/28; H04W 76/30; H04W 4/005;
(Continued)

(56) References Cited

U.S. PATENT DOCUMENTS 8,837,348 B2   9/2014  Wang et al.
9,712,213 B2 *  7/2017  Mochizuki ............. H04B 7/024
(Continued)

FOREIGN PATENT DOCUMENTS

CN   101771505 A   7/2010
CN   101969644 A   2/2011
(Continued)

OTHER PUBLICATIONS

"Considerations on SRS simultaneous transmission for intra-band CA in Rel-10," 3GPP TSG RAN WG4 Meeting #58AH, Shanghai, China, R4-111809, 3rd Generation Partnership Project, Valbonne, France (Apr. 11-15, 2011).
(Continued)

*Primary Examiner* — Christopher M Crutchfield
*Assistant Examiner* — Tito Pham
(74) *Attorney, Agent, or Firm* — Leydig, Voit & Mayer, Ltd.

(57) ABSTRACT

The present disclosure discloses a method, an AP, a server, and an STA used for coordinated transmission. The method includes: an AP receives an uplink preamble training sequence transmitted by an STA; the AP determines uplink quality information according to the uplink preamble training sequence; and the AP transmits the uplink quality information to a server, to enable the server to determine a downlink coordinated transmission set according to the uplink quality information. The method, the AP, the server, and the STA used for coordinated transmission according to embodiments of the present disclosure can realize coordinated transmission among multiple APs, and thus data throughput can be improved.

14 Claims, 13 Drawing Sheets

(51) Int. Cl.
  *H04B 7/024* (2017.01)
  *H04W 24/10* (2009.01)
  *H04W 72/08* (2009.01)
  *H04W 72/12* (2009.01)

(58) Field of Classification Search
  CPC . H04W 40/005; H04W 40/246; H04W 48/14; H04W 52/0209; H04W 52/0225; H04W 52/0235; H04W 52/0258; H04W 52/04; H04W 72/0406; H04W 76/048; H04W 76/06; H04B 5/00; H04L 65/4084; H04L 65/608
  See application file for complete search history.

(56) References Cited

U.S. PATENT DOCUMENTS

| | | | |
|---|---|---|---|
| 2010/0233975 A1* | 9/2010 | Wu | H04W 52/52 455/115.1 |
| 2012/0128090 A1 | 5/2012 | Seok | |
| 2012/0134280 A1* | 5/2012 | Rotvold | H04B 17/24 370/252 |
| 2012/0281555 A1 | 11/2012 | Gao et al. | |
| 2012/0300874 A1 | 11/2012 | Zhang | |
| 2012/0327904 A1 | 12/2012 | Park et al. | |
| 2013/0021925 A1* | 1/2013 | Yin | H04B 7/024 370/252 |
| 2013/0107916 A1* | 5/2013 | Liu | H04B 7/0452 375/219 |
| 2013/0225193 A1* | 8/2013 | Lee | H04W 72/1231 455/452.2 |
| 2015/0365157 A1* | 12/2015 | Yang | H04B 7/024 370/329 |

FOREIGN PATENT DOCUMENTS

| | | |
|---|---|---|
| CN | 101986574 A | 3/2011 |
| CN | 102480756 A | 5/2012 |
| CN | 102710395 A | 10/2012 |
| CN | 102946611 A | 2/2013 |

OTHER PUBLICATIONS

"3$^{rd}$ Generation Partnership Project; Technical Specification Group Radio Access Network; Coordinated multi-point operation for LTE physical layer aspects (Release 11)," 3GPP TR 36.819, V11.1.0, pp. 1-69, 3$^{rd}$ Generation Partnership Project, Valbonne, France (Dec. 2011).

"Management of CoMP and RRM measurement set," 3GPP TSG-RAN WG1 #68, Dresden, Germany, R1-120627, 3$^{rd}$ Generation Partnership Project, Valbonne, France (Feb. 6-10, 2012).

Määttänen et al., "System-level performance of LTE-Advanced with joint transmission and dynamic point selection schemes," EURASIP Journal on Advances in Signal Processing, SpringerOpen, http://www.asp.eurasipjournals.com/content/2012/1/247, Nov. 27, 2012.

Cariou et al., "Carrier-oriented WIFI for cellular offload," IEEE 802.11-12/0910r0, Institute of Electrical and Electronics Engineers, New York, New York (Jul. 17, 2012).

Sayana et al., "Wi-Fi for Hotspot Deployments and Cellular Offload," IEEE 802.11-12/1126r0, Institute of Electrical and Electronics Engineers, New York, New York (Sep. 18, 2012).

"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Std 802.11n-2009, pp. i-502, Institute of Electrical and Electronics Engineers, New York, New York (Oct. 29, 2009).

\* cited by examiner

METHOD, ACCESS POINT, SERVER AND STATION USED FOR COORDINATED TRANSMISSION

CROSS REFERENCE TO RELATED APPLICATIONS

This application is a continuation of International Patent Application No. PCT/CN2013/087464, filed on Nov. 20, 2013, which claims priority to Chinese Patent Application No. 201310163391.4, filed on May 7, 2013, both of which are hereby incorporated by reference in their entireties.

TECHNICAL FIELD

The present disclosure relates to the field of wireless communication technologies and, in particular, to a method, an access point, a server and a station used for coordinated transmission.

BACKGROUND

With popularity of various mobile, fixed and handheld intelligent terminals, the demand for mobile data will be explosively increased in the future, which causes that either a cellular network or a wireless local area network (WLAN) is continuously devoted to network expansion and upgrading by using a new technique and a new solution. A WLAN system has an advantage of low costs as a result of an unlicensed spectrum, although the WLAN system is applicable to an indoor or a hotspot scenario and has disadvantages of poor mobility and severe interference, wireless fidelity (WiFi) as WLAN is still regarded as an important means for indoor, hotspot, enterprise and home data offloading by a majority of operators, equipment providers, enterprises and institutions.

An IEEE 802.11X standard uses an access mode of carrier sense multiple access with collision avoidance (CSMA/CA) to simply reduce costs of a WiFi chip or device, but the CSMA/CA is a multiple access mode based on a media access control (MAC) layer rather than based on a physical layer (PHY), which causes that the WiFi does not have a scheduling mechanism based on the PHY layer, thus, there will be a collision when a plurality of stations (STA) have services simultaneously, which causes bottlenecks of throughput of downlink (DL) or uplink (UL) data. These bottlenecks result in that the current WiFi cannot provide higher data throughput.

SUMMARY

Embodiments of the present disclosure provide a method, an access point, a server and a station used for coordinated transmission, which can improve data throughput.

In a first aspect, a method used for coordinated transmission is provided, including: receiving, by an access point (AP), an uplink preamble training sequence transmitted by a station STA; determining, by the AP, uplink quality information according to the uplink preamble training sequence; and transmitting, by the AP, the uplink quality information to a server, to enable the server to determine a downlink coordinated transmission set according to the uplink quality information.

In a first possible implementation, the method further includes: receiving, by the AP, a downlink coordinated transmission set notification message transmitted by the server to the downlink coordinated transmission set; transmitting, by the AP, a null data packet (NDP) to the STA according to the downlink coordinated transmission set notification message, where the NDP carries information indicating that a feedback type is coordinated transmission, to enable the STA to measure downlink channel state information (CSI); receiving, by the AP, downlink CSI corresponding to the downlink coordinated transmission set transmitted by the STA; transmitting, by the AP, the downlink CSI corresponding to the downlink coordinated transmission set to the server, to enable the server to determine coordinated information according to the downlink CSI corresponding to the downlink coordinated transmission set; receiving, by the AP, the coordinated information transmitted by the server; and performing, by the AP, downlink coordinated transmission to the STA according to the coordinated information.

With reference to the first aspect or the first possible implementation of the first aspect, in a second possible implementation, the uplink preamble training sequence is a newly-added precoding symbol, and the newly-added precoding symbol is used for CSI measurement.

With reference to the first aspect or the first or the second possible implementation of the first aspect, in a third possible implementation, the uplink quality information includes an uplink quality indicator (Link Quality Indicator, LQI); the determining, by the AP, the uplink quality information according to the uplink preamble training sequence includes: determining, by the AP, uplink received signal strength indication (RSSI) of the uplink preamble training sequence through an energy detection (ED) algorithm, and determining the uplink LQI according to the uplink RSSI.

With reference to the first aspect or the first or the second possible implementation of the first aspect, in a fourth possible implementation, the uplink quality information includes uplink CSI; the determining, by the AP, the uplink quality information according to the uplink preamble training sequence includes: determining, by the AP, the uplink CSI through a CSI detection algorithm.

With reference to the first possible implementation of the first aspect, in a fifth possible implementation, the receiving, by the AP, the downlink CSI corresponding to the downlink coordinated transmission set transmitted by the STA includes: receiving, by the AP, the downlink CSI corresponding to the downlink coordinated transmission set transmitted by the STA through a CSMA/CA mechanism.

In a second aspect, a method used for coordinated transmission is provided, including: receiving, by a server, uplink quality information transmitted by an access point AP, where, the uplink quality information is determined by the AP according to an uplink preamble training sequence transmitted by a station STA; and determining, by the server, a downlink coordinated transmission set according to the uplink quality information.

In a first possible implementation, the uplink preamble training sequence is a newly-added precoding symbol, and the newly-added precoding symbol is used for channel state information CSI measurement.

With reference to the second aspect or the first possible implementation of the second aspect, in a second possible implementation, the determining, by the server, the downlink coordinated transmission set according to the uplink quality information includes: determining, by the server, a downlink coordinated measurement set according to the uplink quality information; and determining, by the server, the downlink coordinated transmission set from the downlink coordinated measurement set.

With reference to the second possible implementation of the second aspect, in a third possible implementation, the uplink quality information includes an uplink quality indicator LQI; the determining, by the server, the downlink coordinated measurement set according to the uplink quality information includes: selecting, by the server, an AP having a high uplink LQI as the downlink coordinated measurement set; the determining, by the server, the downlink coordinated transmission set from the downlink coordinated measurement set includes: further selecting, by the server, an AP having a high uplink LQI from the downlink coordinated measurement set as the downlink coordinated transmission set.

With reference to the second possible implementation of the second aspect, in a fourth possible implementation, the uplink quality information includes uplink CSI; the determining, by the server, the downlink coordinated measurement set according to the uplink quality information includes: selecting, by the server, an AP having high uplink CSI as the downlink coordinated measurement set; the determining, by the server, the downlink coordinated transmission set from the downlink coordinated measurement set includes: further selecting, by the server, an AP having high uplink CSI from the downlink coordinated measurement set as the downlink coordinated transmission set.

With reference to the second possible implementation of the second aspect, in a fifth possible implementation, the uplink quality information includes an uplink LQI and uplink CSI; the determining, by the server, the downlink coordinated measurement set according to the uplink quality information includes: selecting, by the server, an AP having a high uplink LQI as the downlink coordinated measurement set; the determining, by the server, the downlink coordinated transmission set from the downlink coordinated measurement set includes: selecting, by the server, an AP having high uplink CSI from the downlink coordinated measurement set as the downlink coordinated transmission set.

With reference to the second aspect or any one of the possible implementations from the first to the fifth possible implementation of the second aspect, in a sixth possible implementation, the method further includes: transmitting, by the server, a downlink coordinated transmission set notification message to the downlink coordinated transmission set; receiving, by the server, downlink CSI corresponding to the downlink coordinated transmission set transmitted by a first AP in the downlink coordinated transmission set, where, the downlink CSI corresponding to the downlink coordinated transmission set is measured by the STA according to a null data packet NDP transmitted by each AP in the downlink coordinated transmission set, and is transmitted to the first AP; determining, by the server, coordinated information according to the downlink CSI corresponding to the downlink coordinated transmission set; and transmitting, by the server, the coordinated information to the downlink coordinated transmission set, to enable the downlink coordinated transmission set to perform downlink coordinated transmission to the STA according to the coordinated information.

In a third aspect, a method used for coordinated transmission is provided, including: transmitting, by a station STA, an uplink preamble training sequence to an access point AP, to enable the AP to determine uplink quality information according to the uplink preamble training sequence; receiving, by the STA, a null data packet NDP transmitted by each AP in a downlink coordinated transmission set, where the NDP carries information indicating that a feedback type is coordinated transmission, and the downlink coordinated transmission set is determined by a server according to the uplink quality information; measuring, by the STA, downlink channel state information CSI according to the NDP; transmitting, by the STA, downlink CSI corresponding to the downlink coordinated transmission set to a first AP in the downlink coordinated transmission set; and receiving, by the STA, data transmitted by the downlink coordinated transmission set through downlink coordinated transmission according to coordinated information, where the coordinated information is determined by the server according to the downlink CSI corresponding to the downlink coordinated transmission set.

In a first possible implementation, the uplink preamble training sequence is a newly-added precoding symbol, and the newly-added precoding symbol is used for CSI measurement.

With reference to the third aspect or the first possible implementation of the third aspect, in a second possible implementation, the uplink quality information includes an uplink quality indicator LQI, and the uplink LQI is determined by the AP through an energy detection ED algorithm.

With reference to the third aspect or the first possible implementation of the third aspect, in a third possible implementation, the uplink quality information includes uplink CSI, and the uplink CSI is determined by the AP through a CSI detection algorithm.

With reference to the third aspect or any one of the possible implementations from the first to the third possible implementation of the third aspect, in a fourth possible implementation, the transmitting, by the STA, the downlink CSI corresponding to the downlink coordinated transmission set to the first AP in the downlink coordinated transmission set includes: transmitting, by the STA, the downlink CSI corresponding to the downlink coordinated transmission set to the first AP through a CSMA/CA mechanism.

In a fourth aspect, an access point AP is provided, including: a receiving module, configured to receive an uplink preamble training sequence transmitted by a station STA; a determining module, configured to determine uplink quality information according to the uplink preamble training sequence; and a transmitting module, configured to transmit the uplink quality information to a server, to enable the server to determine a downlink coordinated transmission set according to the uplink quality information.

In a first possible implementation, the receiving module is further configured to receive a downlink coordinated transmission set notification message transmitted by the server to the downlink coordinated transmission set; the transmitting module is further configured to transmit a null data packet NDP to the STA according to the downlink coordinated transmission set notification message, where the NDP carries information indicating that a feedback type is coordinated transmission, to enable the STA to measure downlink channel state information CSI; the receiving module is further configured to receive downlink CSI corresponding to the downlink coordinated transmission set transmitted by the STA; the transmitting module is further configured to transmit the downlink CSI corresponding to the downlink coordinated transmission set to the server, to enable the server to determine coordinated information according to the downlink CSI corresponding to the downlink coordinated transmission set; the receiving module is further configured to receive the coordinated information transmitted by the server; and the transmitting module is further configured to perform downlink coordinated transmission to the STA according to the coordinated information.

With reference to the fourth aspect or the first possible implementation of the fourth aspect, in a second possible implementation, the uplink preamble training sequence is a newly-added precoding symbol, and the newly-added precoding symbol is used for CSI measurement.

With reference to the fourth aspect or the first or the second possible implementation of the fourth aspect, in a third possible implementation, the uplink quality information includes an uplink quality indicator LQI; the determining module is specifically configured to determine uplink received signal strength indication RSSI of the uplink preamble training sequence through an energy detection ED algorithm, and determine the uplink LQI according to the uplink RSSI.

With reference to the fourth aspect or the first or the second possible implementation of the fourth aspect, in a fourth possible implementation, the uplink quality information includes uplink CSI; the determining module is specifically configured to determine the uplink CSI through a CSI detection algorithm.

With reference to the first possible implementation of the fourth aspect, in a fifth possible implementation, the receiving module is specifically configured to receive the downlink CSI corresponding to the downlink coordinated transmission set transmitted by the STA through a CSMA/CA mechanism.

In a fifth aspect, a server is provided, including: a receiving module, configured to receive uplink quality information transmitted by an access point AP, where, the uplink quality information is determined by the AP according to an uplink preamble training sequence transmitted by a station STA; and a determining module, configured to determine a downlink coordinated transmission set according to the uplink quality information.

In a first possible implementation, the uplink preamble training sequence is a newly-added precoding symbol, and the newly-added preceding symbol is used for channel state information CSI measurement.

With reference to the fifth aspect or the first possible implementation of the fifth aspect, in a second possible implementation, the determining module includes: a first determining unit, configured to determine a downlink coordinated measurement set according to the uplink quality information; and a second determining unit, configured to determine the downlink coordinated transmission set from the downlink coordinated measurement set.

With reference to the second possible implementation of the fifth aspect, in a third possible implementation, the uplink quality information includes an uplink quality indicator LQI; the first determining unit is specifically configured to select an AP having a high uplink LQI as the downlink coordinated measurement set; and the second determining unit is specifically configured to further select an AP having a high uplink LQI from the downlink coordinated measurement set as the downlink coordinated transmission set.

With reference to the second possible implementation of the fifth aspect, in a fourth possible implementation, the uplink quality information includes uplink CSI; the first determining unit is specifically configured to select an AP having high uplink CSI as the downlink coordinated measurement set; and the second determining unit is specifically configured to further select an AP having high uplink CSI from the downlink coordinated measurement set as the downlink coordinated transmission set.

With reference to the second possible implementation of the fifth aspect, in a fifth possible implementation, the uplink quality information includes an uplink LQI and uplink CSI; the first determining unit is specifically configured to select an AP having a high uplink LQI as the downlink coordinated measurement set; and the second determining unit is specifically configured to select an AP having high uplink CSI from the downlink coordinated measurement set as the downlink coordinated transmission set.

With reference to the fifth aspect or any one of the possible implementations from the first to the fifth possible implementation of the fifth aspect, in a sixth possible implementation, the server further includes: a transmitting module, configured to transmit a downlink coordinated transmission set notification message to the downlink coordinated transmission set; the receiving module is further configured to receive downlink CSI corresponding to the downlink coordinated transmission set transmitted by a first AP in the downlink coordinated transmission set, where, the downlink CSI corresponding to the downlink coordinated transmission set is measured by the STA according to a null data packet NDP transmitted by each AP in the downlink coordinated transmission set, and is transmitted to the first AP; the determining module is further configured to determine coordinated information according to the downlink CSI corresponding to the downlink coordinated transmission set; and the transmitting module is further configured to transmit the coordinated information to the downlink coordinated transmission set, to enable the downlink coordinated transmission set to perform downlink coordinated transmission to the STA according to the coordinated information.

In a sixth aspect, a station STA is provided, including: a transmitting module, configured to transmit an uplink preamble training sequence to an access point AP, to enable the AP to determine uplink quality information according to the uplink preamble training sequence; a receiving module, configured to receive a null data packet NDP transmitted by each AP in a downlink coordinated transmission set, where the NDP carries information indicating that a feedback type is coordinated transmission, and the downlink coordinated transmission set is determined by a server according to the uplink quality information; a measuring module, configured to measure downlink channel state information CSI according to the NDP; the transmitting module is further configured to transmit downlink CSI corresponding to the downlink coordinated transmission set to a first AP in the downlink coordinated transmission set; and the receiving module is further configured to receive data transmitted by the downlink coordinated transmission set through downlink coordinated transmission according to coordinated information, where the coordinated information is determined by the server according to the downlink CSI corresponding to the downlink coordinated transmission set.

In a first possible implementation, the uplink preamble training sequence is a newly-added precoding symbol, and the newly-added precoding symbol is used for CSI measurement.

With reference to the sixth aspect or the first possible implementation of the sixth aspect, in a second possible implementation, the uplink quality information includes an uplink quality indicator LQI, and the uplink LQI is determined by the AP through an energy detection ED algorithm.

With reference to the sixth aspect or the first possible implementation of the sixth aspect, in a third possible implementation, the uplink quality information includes uplink CSI, and the uplink CSI is determined by the AP through a CSI detection algorithm.

With reference to the sixth aspect or any one of the possible implementations from the first to the third possible implementation of the sixth aspect, in a fourth possible implementation, the transmitting module is specifically configured to transmit the downlink CSI corresponding to the downlink coordinated transmission set to the first AP through a CSMA/CA mechanism.

Based on the above technical solutions, by means of determining uplink quality information according to an uplink preamble training sequence transmitted by an STA and transmitting the uplink quality information to a server, to enable the server to determine a downlink coordinated transmission set according to the uplink quality information, embodiments of the present disclosure can realize coordinated transmission among multiple APs, and thus data throughput can be improved.

BRIEF DESCRIPTION OF DRAWINGS

In order to make technical solutions of embodiments of the present disclosure clearer, accompanying drawings used in the description of embodiments of the present disclosure will be briefly described hereunder. Obviously, the described drawings are merely some embodiments of present disclosure. For persons skilled in the art, other drawings may be obtained based on these drawings without any creative effort.

DESCRIPTION OF EMBODIMENTS

Technical solutions in embodiments of the present disclosure will be described clearly and completely hereunder with reference to accompanying drawings in embodiments of the present disclosure. Obviously, the described embodiments are only a part of embodiments of the present disclosure, rather than all embodiments of the present disclosure. All other embodiments obtained by persons of ordinary skill in the art based on embodiments of the present disclosure without any creative effort shall fall within the protection scope of the present disclosure.

The technical solutions of embodiments of the present disclosure may be applied to various WLAN systems.

It should be understood that, in embodiments of the present disclosure, for ease of description, a link from an AP to an STA is referred to as downlink, and a link from the STA to the AP is referred to as uplink, where descriptions of the uplink and the downlink should not limit the protection scope of the embodiments of the present disclosure.

Figure 1:
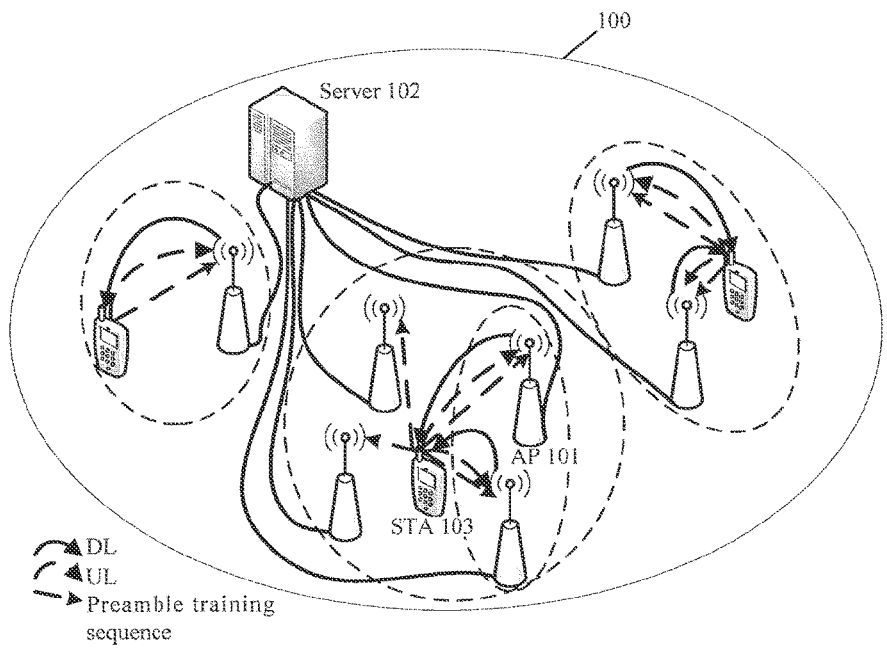
FIG. 1 is a schematic diagram of an example of a scenario to which an embodiment of the present disclosure can be applied.

FIG. 1 is a schematic diagram of an example of a scenario to which an embodiment of the present disclosure can be applied. A communication system 100 as shown in FIG. 1 includes an AP 101, a server 102 and an STA 103. Multiple STAs 103 are distributed in the coverage of multiple APs 101. The multiple APs 101 are connected to the server 102 in a wired or wireless manner via a Backhaul. A server is also called as an access controller (AC). The multiple APs 101 may use a same cell ID, in this case, the multiple APs 101 are transparent to an STA 103, that is, the STA 103 cannot distinguish which AP 101 or which APs-101 serve(s) the STA 103 itself specifically. Or, the multiple APs 101 may also use different cell IDs, embodiments of the present disclosure are not limited thereto.

Figure 2:
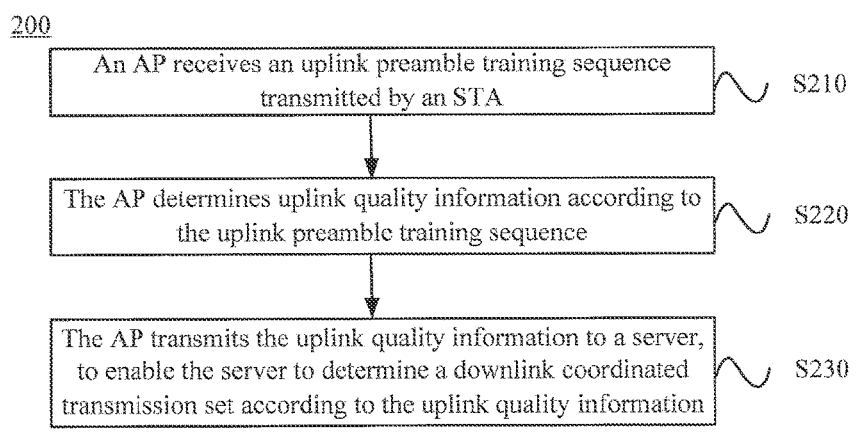
FIG. 2 is a schematic flow chart of a method used for coordinated transmission according to an embodiment of the present disclosure.

FIG. 2 is a schematic flow chart of a method 200 used for coordinated transmission according to an embodiment of the present disclosure. The method as shown in FIG. 2 is performed by an AP (such as an AP 101 in FIG. 1). As shown in FIG. 2, the method 200 includes:

S210, an AP receives an uplink preamble training sequence transmitted by an STA;

S220, the AP determines uplink quality information according to the uplink preamble training sequence; and S230, the AP transmits the uplink quality information to a server, to enable the server to determine a downlink coordinated transmission set according to the uplink quality information.

In the embodiment of the present disclosure, in order to realize downlink coordinated transmission in a WiFi system, uplink quality information is determined through an uplink preamble training sequence, and then a downlink coordinated transmission set is determined based on the uplink quality information by utilizing reciprocity between uplink and downlink so as to perform downlink coordinated transmission. An AP firstly receives an uplink preamble training sequence transmitted by an STA, and determines uplink quality information according to the uplink preamble training sequence, and then transmits the uplink quality information to a server. The server determines a downlink coordinated transmission set according to the uplink quality information. Thus, coordinated transmission among multiple APs can be realized in the WiFi system, thereby improving data throughput.

Therefore, according to the method used for coordinated transmission in embodiments of the present disclosure, coordinated transmission among multiple APs can be realized by determining uplink quality information according to an uplink preamble training sequence transmitted by an STA and transmitting the uplink quality information to a server to enable the server to determine a downlink coordinated transmission set according to the uplink quality information, and thus data throughput can be improved.

In S210, an AP receives an uplink preamble training sequence transmitted by an STA.

Specifically, the STA transmits the uplink preamble training sequence to all APs nearby, so that each AP determines corresponding uplink quality information. The AP receives the uplink preamble training sequence transmitted by the STA to acquire the uplink quality information. The uplink preamble training sequence may use a preamble training sequence of an existing standard, and may also use a new preamble training sequence.

Figure 3A:
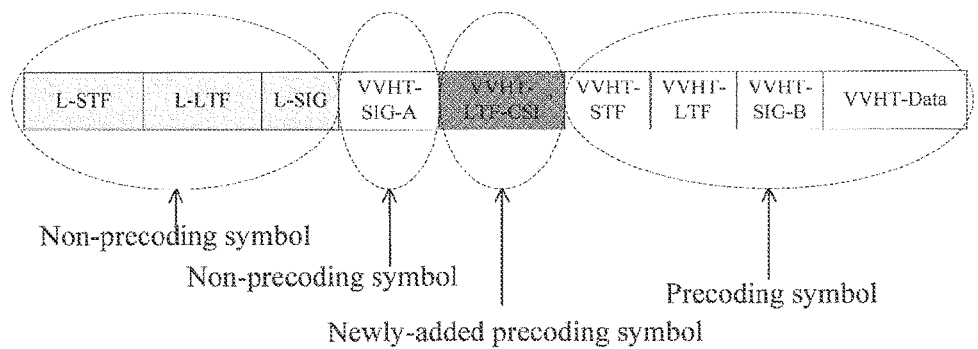
FIG. 3A and FIG. 3B are schematic diagrams of an uplink preamble training sequence according to an embodiment of the present disclosure.
Figure 3B:
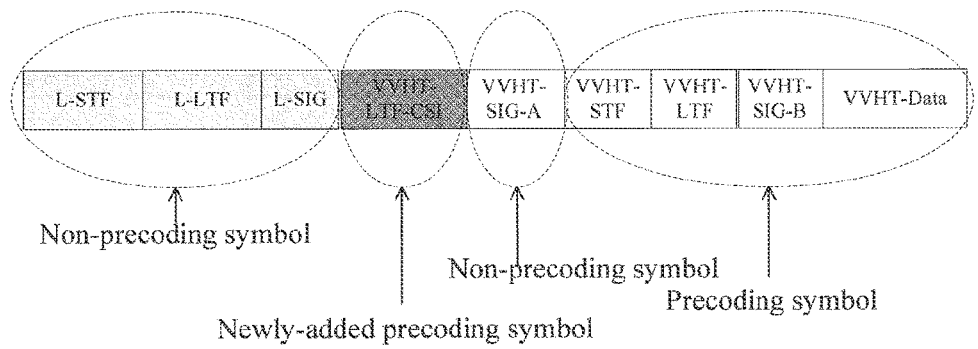

Optionally, the uplink preamble training sequence is a newly-added precoding symbol, and the newly-added precoding symbol is used for CSI measurement. For instance, as shown in FIG. 3A and FIG. 3B, a VVHT-LTF-CSI field may be increased in an existing frame format, the field uses a precoding symbol, and serves as an uplink preamble training sequence for measuring uplink quality. Optionally, the VVHT-LTF-CSI field may be behind a VVHT-SIG-A field, as shown in FIG. 3A; the VVHT-LTF-CSI field may be in front of the VVHT-SIG-A field, as shown in FIG. 3B.

Figure 4:
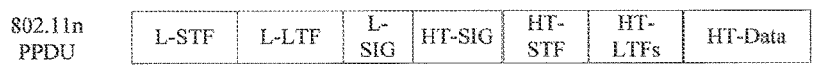
FIG. 4 is a schematic diagram of an uplink preamble training sequence according to another embodiment of the present disclosure.
Figure 4:
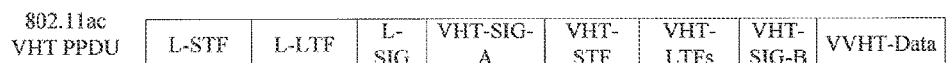

It should be understood that, the uplink preamble training sequence may also be a preamble training sequence in an existing standard. For instance, the uplink quality may be measured using an L-STF field and an L-LTF field as shown in FIG. 4.

In S220, the AP determines uplink quality information according to the uplink preamble training sequence.

The AP detects the uplink preamble training sequence to obtain the uplink quality information.

Optionally, the uplink quality information includes an uplink LQI;

S220 includes:

The AP determines an uplink RSSI of the uplink preamble training sequence through an ED algorithm, and determines the uplink LQI according to the uplink RSSI.

The AP receives the uplink preamble training sequence and detects the uplink RSSI through the ED algorithm, and quantifies the uplink RSSI as the uplink LQI.

Optionally, the uplink quality information includes uplink CSI;

S220 includes:

The AP determines the uplink CSI through a CSI detection algorithm.

The AP receives the uplink preamble training sequence and detects the uplink CSI through the CSI detection algorithm. For instance, when the uplink preamble training sequence as shown in FIG. 3A or FIG. 3B is used, the AP acquires the uplink CSI by detecting a precoding symbol of a newly-added VVHT-LTF-CSI field.

In S230, the AP transmits the uplink quality information to a server, to enable the server to determine a downlink coordinated transmission set according to the uplink quality information.

Each AP transmits the measured uplink quality information, such as the uplink LQI and/or the uplink CSI, to the server, and the server determines the downlink coordinated transmission set according to the uplink quality information by utilizing the reciprocity between uplink and downlink.

The server may determine a downlink coordinated measurement set according to the uplink quality information firstly, and then determine the downlink coordinated transmission set from the downlink coordinated measurement set.

Optionally, when the uplink quality information includes the uplink LQI, the server firstly selects an AP having a high uplink LQI as the downlink coordinated measurement set, and then further selects an AP having a high uplink LQI from the downlink coordinated measurement set as the downlink coordinated transmission set.

Figure 5:
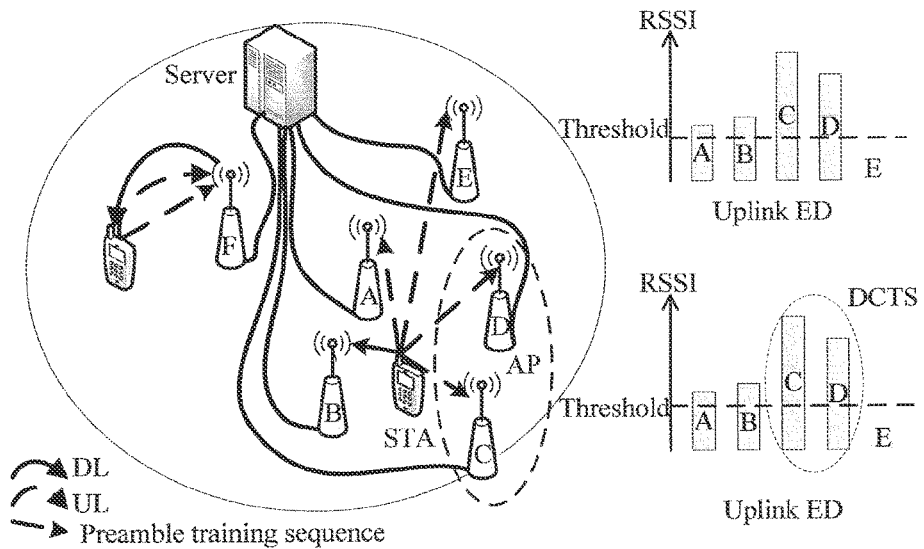
FIG. 5 is a schematic diagram of a method for determining a downlink coordinated transmission set according to an embodiment of the present disclosure.

As shown in FIG. 5, the server selects four APs with the best uplink LQI (for instance, exceeding a threshold value), that is, the four APs including A, B, C and D. Since the WiFi system is a time division duplexing (TDD) system, there is reciprocity between uplink and downlink, that is, downlink quality is similar to uplink quality, then, downlink LQIs corresponding to the four APs including A, B, C and D having the best uplink LQIs are also the best, that is, the four APs including A. B, C and D also have the best downlink CSI. Thus, the server determines the four APs including A, B, C and D as a downlink coordinated measurement set (DCMS). The reason why the DCMS is determined according to the reciprocity between DL and UL of the TDD system and an ED detection algorithm is that, most of WiFi systems are indoor systems or low speed or medium speed systems, a channel changes relatively slowly, and large-scale, medium-scale and small-scale fading are not very serious, thus, the DCMS changes relatively slowly, which provides a realistic scenario for the application of the reciprocity of DL and UL of the TDD system and the ED detection algorithm.

Then, the server selects two APs including C and D having the highest uplink LQI from the downlink coordinated measurement set, i.e., the four APs including A, B, C and D, as a downlink coordinated transmission set (DCTS). The reason why the DCTS is determined according to the DCMS is also that, most of WiFi systems are indoor systems or low speed or medium speed systems, a channel changes relatively slowly, and large-scale, medium-scale and small-scale fading are not very serious, thus, the DCTS changes relatively small, therefore, the DCMS definitely has an AP of the DCTS.

Optionally, when the uplink quality information includes the uplink CSI, the server firstly selects an AP having high uplink CSI as the downlink coordinated measurement set, and then further selects an AP having high uplink CSI from the downlink coordinated measurement set as the downlink coordinated transmission set.

Figure 6:
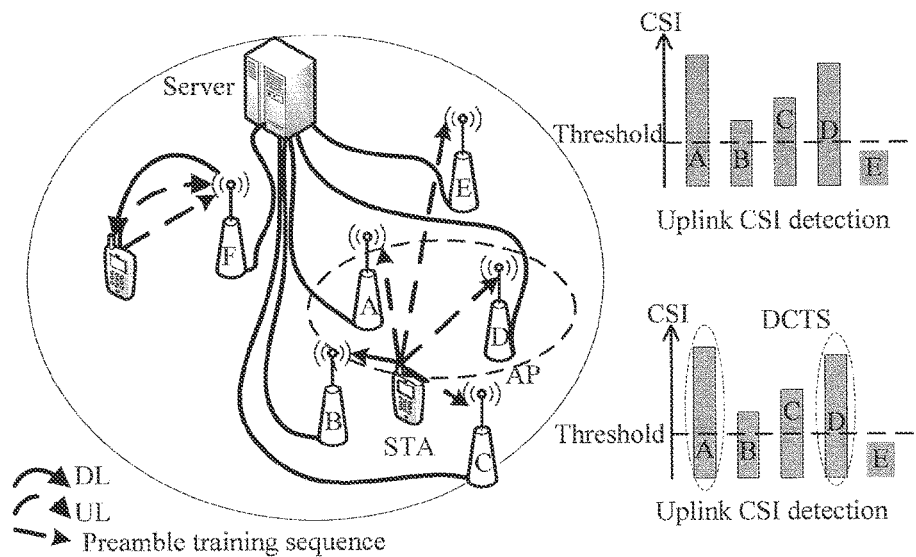
FIG. 6 is a schematic diagram of a method for determining a downlink coordinated transmission set according to another embodiment of the present disclosure.

As shown in FIG. 6, the server selects four APs having the best uplink CSI (for instance, exceeding a threshold value), that is, four APs including A, B, C and D. According to the reciprocity between uplink and downlink, the four APs including A, B, C and D are determined as a downlink coordinated measurement set. Then, the server selects two APs including A and D having the highest uplink CSI from the downlink coordinated measurement set, i.e., the four APs including A, B, C and D, as a downlink coordinated transmission set.

Optionally, when the uplink quality information includes the uplink LQI and the uplink CSI, the sever first selects an AP having a high uplink LQI as the downlink coordinated measurement set, and then selects an AP having high uplink CSI from the downlink coordinated measurement set as the downlink coordinated transmission set.

Figure 7:
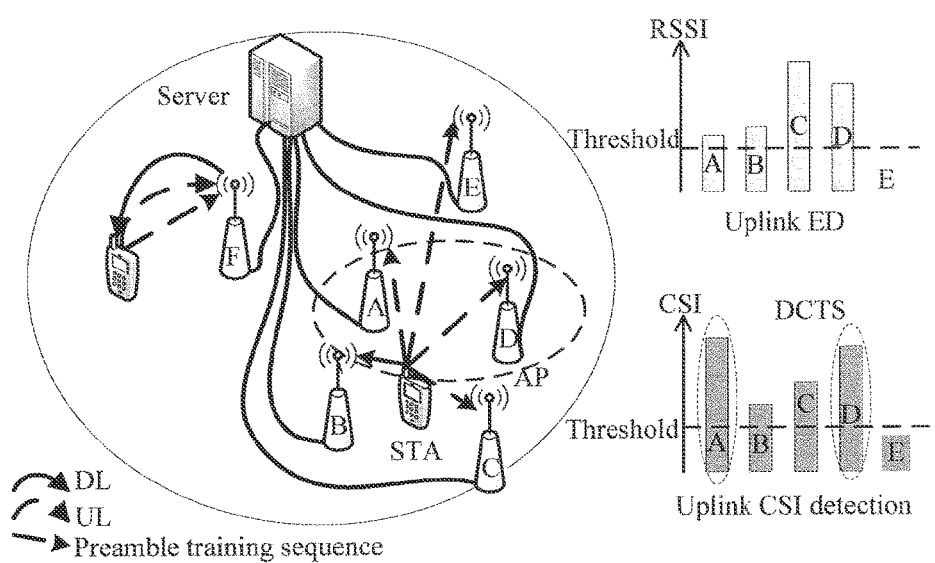
FIG. 7 is a schematic diagram of a method for determining a downlink coordinated transmission set according to still another embodiment of the present disclosure.

As shown in FIG. 7, the server selects four APs having the best uplink LQI (for instance, exceeding a threshold value), that is, four APs including A, B, C and D. According to the reciprocity between uplink and downlink, the four APs including A, B, C and D are determined as a downlink coordinated measurement set. Then, the server selects two APs including A and D having the highest uplink CSI from the downlink coordinated measurement set, i.e., the four APs including A, B, C and D, as a downlink coordinated transmission set.

Figure 8:
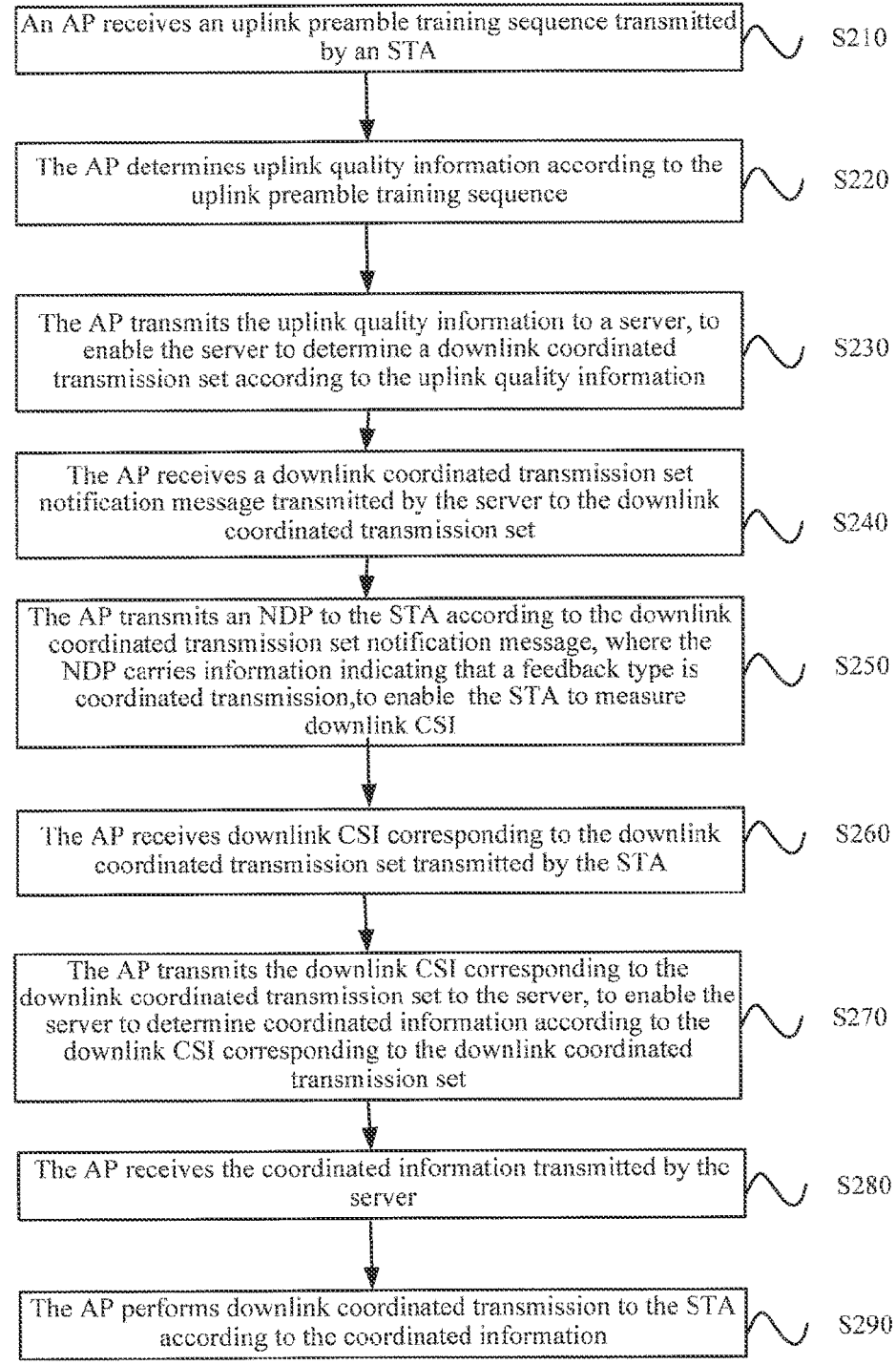
FIG. 8 is another schematic flow chart of a method used for coordinated transmission according to an embodiment of the present disclosure.

In the embodiment of the present disclosure, as shown in FIG. 8, optionally, the method 200 also includes:

S240, the AP receives a downlink coordinated transmission set notification message transmitted by the server to the downlink coordinated transmission set;

S250, the AP transmits an NDP to the STA according to the downlink coordinated transmission set notification message, where the NDP carries information indicating that a feedback type is coordinated transmission, to enable the STA to measure downlink CSI;

S260, the AP receives downlink CSI corresponding to the downlink coordinated transmission set transmitted by the STA;

S270, the AP transmits the downlink CSI corresponding to the downlink coordinated transmission set to the server, to enable the server to determine coordinated information according to the downlink CSI corresponding to the downlink coordinated transmission set;

S280, the AP receives the coordinated information transmitted by the server, and S290, the AP performs downlink coordinated transmission to the STA according to the coordinated information.

Figure 9A:
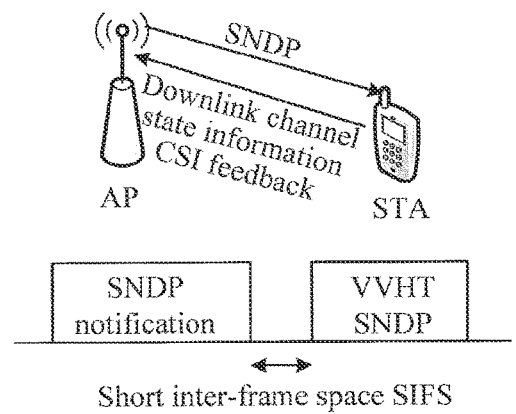
FIG. 9A~FIG. 9C are schematic diagrams of an SNDP according to an embodiment of the present disclosure.

After determining a downlink coordinated transmission set, the server transmits a notification message to the downlink coordinated transmission set, and notifies the determined downlink coordinated transmission set to each AP in the downlink coordinated transmission set. The AP receives the notification message, and determines that it is in the downlink coordinated transmission set, and then notifies the STA of feeding back downlink CSI. The AP transmits an NDP to the STA, so that the STA measures the downlink CSI. The NDP carries information indicating that a feedback type is coordinated transmission, that is to say, the NDP transmitted by the AP to the STA carries indication information, which indicates that the feedback type is coordinated transmission, in embodiments of the present disclosure, the NDP is called as an SNDP (Sounding NDP), as shown in FIG. 9A.

Figure 9B:
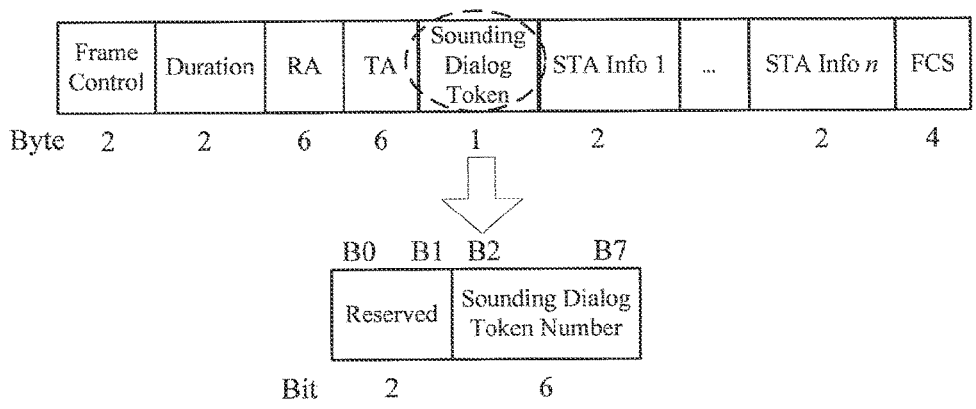

Optionally, as shown in FIG. 9B, two bits reserved in a Sounding Dialog Token field of an NDP frame format may be used to indicate a feedback type, for instance, 00 represents that there is no coordination, 01 represents that there is coordination, 10 represents keep reserved, and 11 represents keep reserved.

Figure 9C:
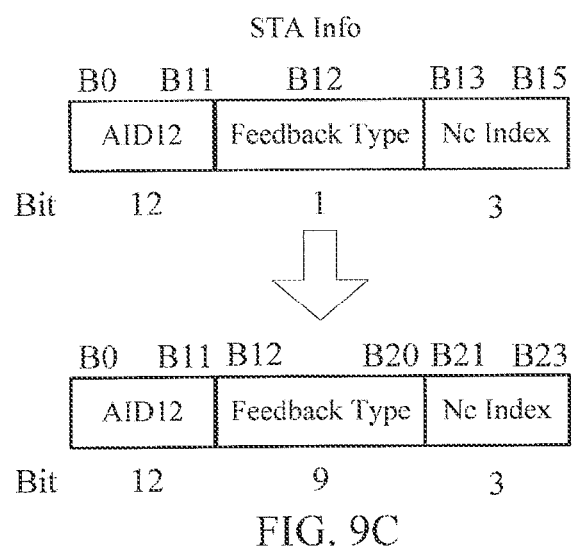

Optionally, as shown in FIG. 9C, an STA info field of the NDP frame format may also be extended, and the STA info field is increased to 3 bytes, that is, a Feedback Type field in the STA info field is extended to 9 bits. Thus, the Feedback Type field may also indicate an increased coordinated feedback type besides indicating an existing feedback type.

The STA measures downlink CSI corresponding to each AP by detecting an NDP transmitted by an AP in the downlink coordinated transmission set, and acquires downlink CSI corresponding to the downlink coordinated transmission set. That is to say, the downlink CSI corresponding to the downlink coordinated transmission set includes downlink CSI corresponding to each AP in the downlink coordinated transmission set. Then, the STA transmits the downlink CSI corresponding to the downlink coordinated transmission set to an AP (indicated as a first AP) in the downlink coordinated transmission set, thus, the AP receives the downlink CSI corresponding to the downlink coordinated transmission set.

Optionally, S260 includes:

The AP receives the downlink CSI corresponding to the downlink coordinated transmission set transmitted by the STA through a CSMA/CA mechanism.

That is to say, when succeeding in a competition in the CSMA/CA mechanism, the STA feeds back the downlink CSI corresponding to the downlink coordinated transmission set on its own uplink, that is, feeding back downlink CSI corresponding to each AP in the downlink coordinated transmission set.

Figure 10:
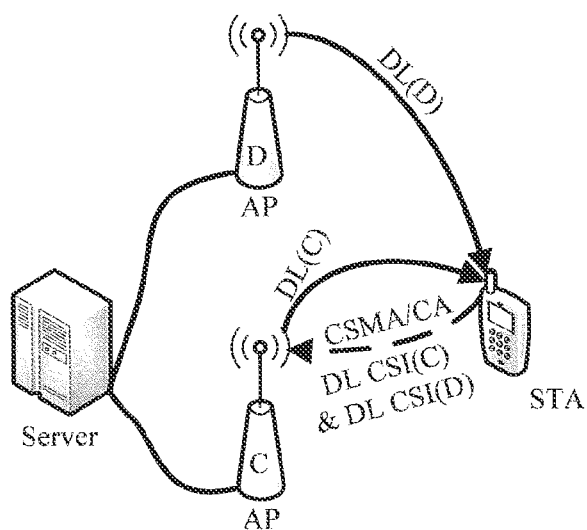
FIG. 10 is a schematic diagram of a method for feeding back downlink CSI according to an embodiment of the present disclosure.

As shown in FIG. 10, both APs including C and D in the downlink coordinated transmission set transmit data to the STA collaboratively, and the STA measures corresponding DL CSI (C) and DL CSI (D). The STA still uses an access mechanism of the CSMA/CA on the uplink, the STA feeds back the DL CSI (C) and the DL CSI (D) to C, thus, it can be ensured that both the DL CSI (C) and the DL CSI (D) are fed back timely.

The AP transmits the downlink CSI corresponding to the downlink coordinated transmission set as received to the server. The server determines coordinated information according to the downlink CSI corresponding to the downlink coordinated transmission set. That is to say, the server exchanges downlink CSI information among multiple APs, and performs joint scheduling of resources, determines coordinated information, and transmits the coordinated information to each AP in the downlink coordinated transmission set.

The AP receives the coordinated information transmitted by the server, and performs downlink coordinated transmission to the STA according to the coordinated information. That is to say, after receiving the coordinated information transmitted by the server, each AP in the downlink coordinated transmission set starts downlink coordinated transmission to transmit data to the STA.

Thus, according to a method used for coordinated transmission in the embodiment of the present disclosure, coordinated transmission among multiple APs can be realized by means of transmitting to a server, uplink quality information determined according to an uplink preamble training sequence transmitted by an STA so as to determine a downlink coordinated transmission set, and then performing downlink coordinated transmission by utilizing coordinated information determined by the server according to downlink CSI corresponding to the downlink coordinated transmission set, and thus data throughput can be improved.

A method used for coordinated transmission according to embodiments of the present disclosure is described above in detail from the perspective of an AP, and a method used for coordinated transmission according to embodiments of the present disclosure will be described hereunder from the perspective of a server.

Figure 11:
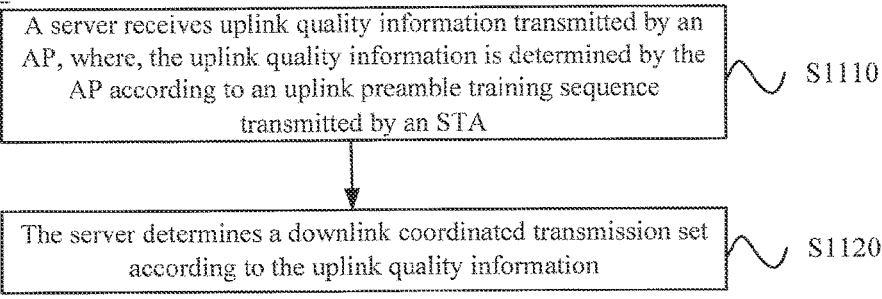
FIG. 11 is a schematic flow chart of a method used for coordinated transmission according to another embodiment of the present disclosure.

FIG. 11 shows a schematic flow chart of a method 1100 used for coordinated transmission according to another embodiment of the present disclosure. The method as shown in FIG. 11 is performed by a server (such as a server 102 in FIG. 1). As shown in FIG. 11, the method 1100 includes:

S1110, a server receives uplink quality information transmitted by an AP, where the uplink quality information is determined by the AP according to an uplink preamble training sequence transmitted by an STA; and S1120, the server determines a downlink coordinated transmission set according to the uplink quality information.

In the embodiment of the present disclosure, uplink quality information is determined through an uplink preamble training sequence, and then a downlink coordinated transmission set is determined based on the uplink quality information by utilizing reciprocity between uplink and downlink so as to perform downlink coordinated transmission. An AP firstly receives an uplink preamble training sequence transmitted by an STA, and determines uplink quality information according to the uplink preamble training sequence, and then transmits the uplink quality information to a server. After receiving the uplink quality information, the server determines a downlink coordinated transmission set according to the uplink quality information. Thus, coordinated transmission among multiple APs can be realized in the WiFi system, thereby improving data throughput.

Thus, according to the method used for coordinated transmission in embodiments of the present disclosure, coordinated transmission among multiple APs can be realized by means of determining a downlink coordinated transmission set by utilizing uplink quality information determined according to an uplink preamble training sequence transmitted by an STA, and thus data throughput can be improved.

In embodiments of the present disclosure, optionally, the uplink preamble training sequence is a newly-added precoding symbol, and the newly-added precoding symbol is used for CSI measurement, such as a VVHT-LTF-CSI field in FIG. 3A and FIG. 3B. Optionally, the uplink preamble training sequence may also be a preamble training sequence in an existing standard, for instance, an L-STF field and an L-LTF field in FIG. 4 may be used to measure uplink quality.

Figure 12:
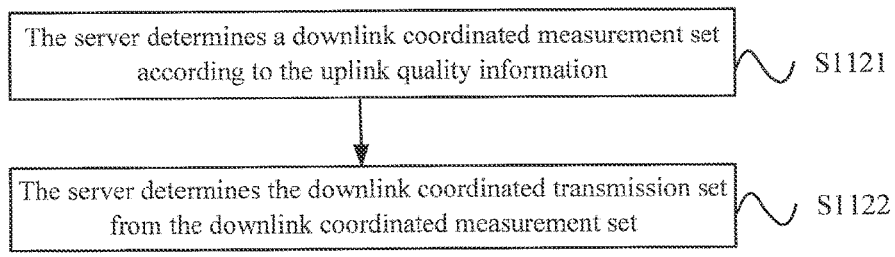
FIG. 12 is a schematic flow chart of a method for determining a downlink coordinated transmission set according to an embodiment of the present disclosure.

In the embodiment of the present disclosure, as shown in FIG. 12, optionally, S1120 includes:

S1121, the server determines a downlink coordinated measurement set according to the uplink quality information; and S1122, the server determines the downlink coordinated transmission set from the downlink coordinated measurement set.

Optionally, the uplink quality information includes an uplink LQI;

S1121 includes: the server selects an AP having a high uplink LQI as the downlink coordinated measurement set;

S1122 includes: the server further selects an AP having a high uplink LQI from the downlink coordinated measurement set as the downlink coordinated transmission set.

As shown in FIG. 5, the server selects four APs having the best uplink LQI (for instance, exceeding a threshold value), that is, four APs including A, B, C and D. According to reciprocity between uplink and downlink, the four APs including A, B, C and D are determined as a downlink coordinated measurement set. Then, the server selects two APs including A and D having the highest uplink LQI from the downlink coordinated measurement set, i.e., the four APs including A, B, C and D, as a downlink coordinated transmission set.

Optionally, the uplink quality information includes uplink CSI;

S1121 includes: the server selects an AP having high uplink CSI as the downlink coordinated measurement set;

S1122 includes: the server further selects an AP having high uplink CSI from the downlink coordinated measurement set as the downlink coordinated transmission set.

As shown in FIG. 6, the server selects four APs having the best uplink CSI (for instance, exceeding a threshold value), that is, four APs including A, B, C and D. According to reciprocity between uplink and downlink, the four APs including A, B, C and D are determined as a downlink coordinated measurement set. Then, the server selects two APs including A and D having the highest uplink CSI from the downlink coordinated measurement set, i.e., the four APs including A, B, C and D, as a downlink coordinated transmission set.

Optionally, the uplink quality information includes an uplink LQI and uplink CSI;

S1121 includes: the server selects an AP having a high uplink LQI as the downlink coordinated measurement set;

S1122 includes: the server selects an AP having high uplink CSI from the downlink coordinated measurement set as the downlink coordinated transmission set.

As shown in FIG. 7, the server selects four APs having the best uplink LQI (for instance, exceeding a threshold value), that is, four APs including A, B, C and D. According to reciprocity between uplink and downlink, the four APs including A, B, C and D are determined as a downlink coordinated measurement set. Then, the server selects two APs including A and D having the highest uplink CSI from the downlink coordinated measurement set, i.e., the four APs including A, B, C and D, as a downlink coordinated transmission set.

Figure 13:
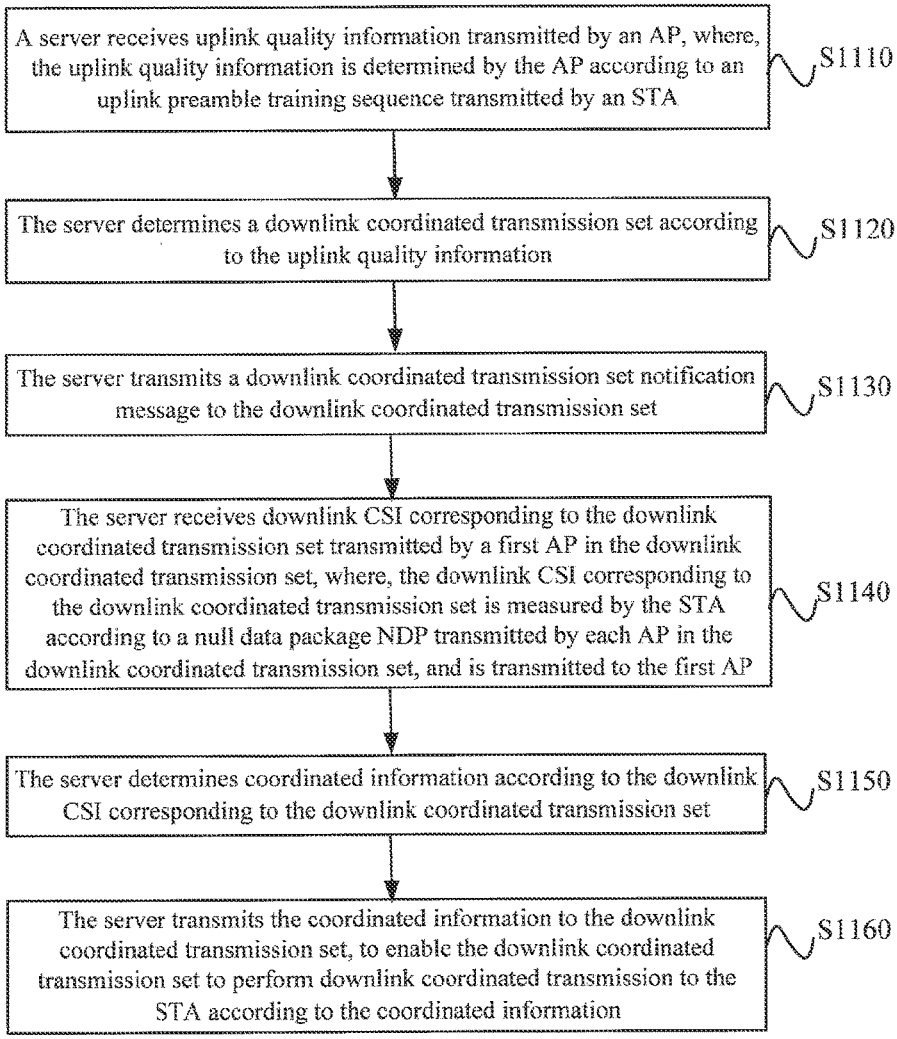
FIG. 13 is another schematic flow chart of a method used for coordinated transmission according to another embodiment of the present disclosure.

In the embodiment of the present disclosure, as shown in FIG. 13, optionally, the method 1100 also includes:

S1130, the server transmits a downlink coordinated transmission set notification message to the downlink coordinated transmission set;

S1140, the server receives downlink CSI corresponding to the downlink coordinated transmission set transmitted by a first AP in the downlink coordinated transmission set, where, the downlink CSI corresponding to the downlink coordinated transmission set is measured by the STA according to a null data packet NDP transmitted by each AP in the downlink coordinated transmission set, and is transmitted to the first AP;

S1150, the server determines coordinated information according to the downlink CSI corresponding to the downlink coordinated transmission set; and S1160, the server transmits the coordinated information to the downlink coordinated transmission set, to enable the downlink coordinated transmission set to perform downlink coordinated transmission to the STA according to the coordinated information.

After determining a downlink coordinated transmission set, the server transmits a notification message to the downlink coordinated transmission set. The AP receives the notification message, and determines that it is in the downlink coordinated transmission set, then notifies the STA of feeding back downlink CSI. The AP transmits an NDP to the STA, and the STA measures the downlink CSI. The STA measures downlink CSI corresponding to each AP by detecting the NDP transmitted by the AP in the downlink coordinated transmission set, and acquires downlink CSI corresponding to the downlink coordinated transmission set. That is to say, the downlink CSI corresponding to the downlink coordinated transmission set includes downlink CSI corresponding to each AP in the downlink coordinated transmission set. Then, the STA transmits the downlink CSI corresponding to the downlink coordinated transmission set to an AP (indicated as a first AP) in the downlink coordinated transmission set.

The first AP transmits the downlink CSI corresponding to the downlink coordinated transmission set as received to the server. The server determines coordinated information according to the downlink CSI corresponding to the downlink coordinated transmission set. That is to say, the server exchanges downlink CSI information among multiple APs, performs joint scheduling of resources, and determines coordinated information. Then, the server transmits the coordinated information to the downlink coordinated transmission set, so that the downlink coordinated transmission set performs downlink coordinated transmission to the STA according to the coordinated information.

It should be understood that, in embodiments of the present disclosure, interactions among an AP, a server and an STA described at an AP side as well as related performance and functions thereof are corresponding to that described at a server side, which will not be repeated herein for the sake of simplicity.

Thus, according to the method used for coordinated transmission in embodiments of the present disclosure, coordinated transmission among multiple APs can be realized by means of determining a downlink coordinated transmission set by utilizing uplink quality information determined according to an uplink preamble training sequence transmitted by an STA, and then determining coordinated information for downlink coordinated transmission according to downlink CSI corresponding to the downlink coordinated transmission set, and thus data throughput can be improved.

A method used for coordinated transmission according to embodiments of the present disclosure is described above in detail from the perspective of an AP and a server, respectively, and a method used for coordinated transmission according to embodiments of the present disclosure will be described hereunder from the perspective of an STA.

Figure 14:
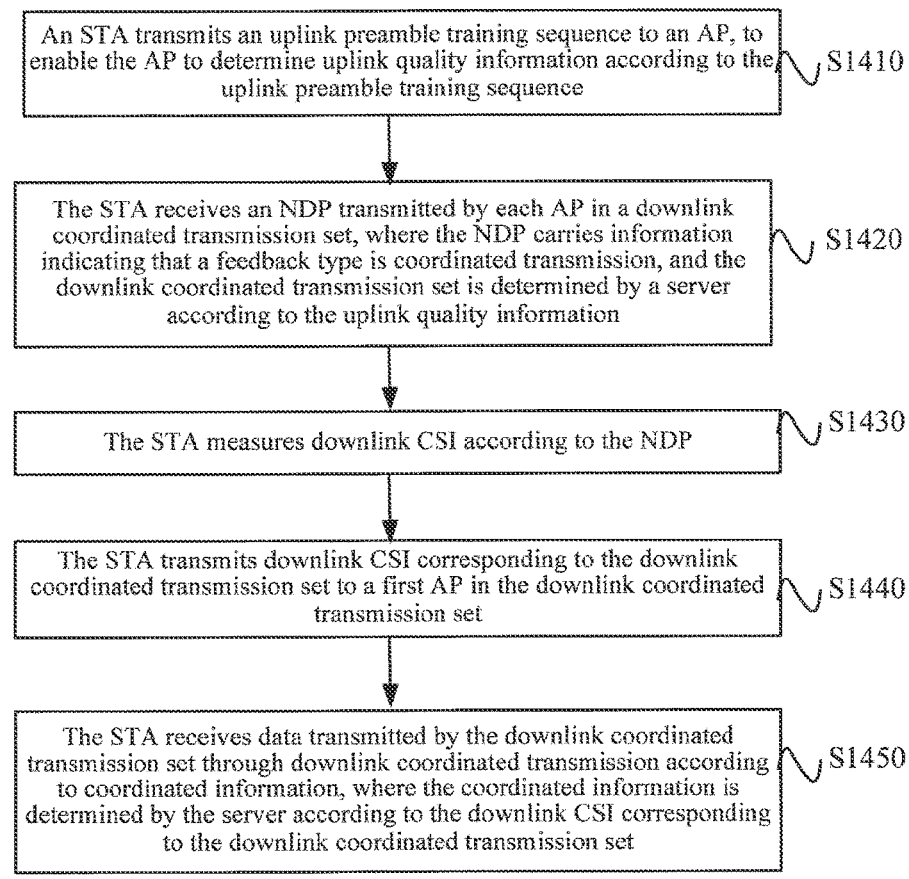
FIG. 14 is a schematic flow chart of a method used for coordinated transmission according to still another embodiment of the present disclosure.

FIG. 14 shows a schematic flow chart of a method 1400 used for coordinated transmission according to still another embodiment of the present disclosure. The method as shown in FIG. 14 is performed by an STA (such as an STA 103 in FIG. 1). As shown in FIG. 14, the method 1400 includes:

S1410, an STA transmits an uplink preamble training sequence to an AP, to enable the AP to determine uplink quality information according to the uplink preamble training sequence;

S1420, the STA receives an NDP transmitted by each AP in a downlink coordinated transmission set, where the NDP carries information indicating that a feedback type is coordinated transmission, and the downlink coordinated transmission set is determined by a server according to the uplink quality information;

S1430, the STA measures downlink CSI according to the NDP;

S1440, the STA transmits downlink CSI corresponding to the downlink coordinated transmission set to a first AP in the downlink coordinated transmission set; and

S1450, the STA receives data transmitted by the downlink coordinated transmission set through downlink coordinated transmission according to coordinated information, where the coordinated information is determined by the server according to the downlink CSI corresponding to the downlink coordinated transmission set.

In embodiments of the present disclosure, uplink quality information is determined through an uplink preamble training sequence, and then a downlink coordinated transmission set is determined based on the uplink quality information by utilizing reciprocity between uplink and downlink so as to perform downlink coordinated transmission. An STA transmits an uplink preamble training sequence to an AP, the AP determines uplink quality information according to the uplink preamble training sequence, and then transmits the uplink quality information to a server, the server determines a downlink coordinated transmission set according to the uplink quality information, and notifies the AP in the downlink coordinated transmission set. After receiving a notification message, the AP determines that it is in the downlink coordinated transmission set, then notifies the STA of feeding back downlink CSI. Each AP in the downlink coordinated transmission set transmits an NDP to the STA, where the NDP carries information indicating that a feedback type is coordinated transmission, that is to say, the NDP transmitted by the AP to the STA carries indication information, which indicates that the feedback type is coordinated transmission, in embodiments of the present disclosure, the NDP is called as an SNDP, as shown in FIG. 9A.

Optionally, as shown in FIG. 9B, two bits reserved in a Sounding Dialog Token field of an NDP frame format may be used to indicate a feedback type.

Optionally, as shown in FIG. 9C, an STA info field of the NDP frame format may also be extended, and the STA info field is increased to 3 bytes, that is, a Feedback Type field in the STA info field is extended to 9 bits. Thus, the Feedback Type field may also indicate an increased coordinated feedback type besides indicating an existing feedback type.

The STA measures downlink CSI corresponding to each AP by detecting an NDP transmitted by an AP in the downlink coordinated transmission set, and acquires downlink CSI corresponding to the downlink coordinated transmission set. That is to say, the downlink CSI corresponding to the downlink coordinated transmission set includes downlink CSI corresponding to each AP in the downlink coordinated transmission set. Then, the STA transmits the downlink CSI corresponding to the downlink coordinated transmission set to an AP (indicated as a first AP) in the downlink coordinated transmission set.

Optionally, S1440 includes: the STA transmits the downlink CSI corresponding to the downlink coordinated transmission set to the first AP through a CSMA/CA mechanism.

That is to say, when succeeding in a competition in the CSMA/CA mechanism, the STA feeds back the downlink CSI corresponding to the downlink coordinated transmission set on its own uplink, that is, feeding back downlink CSI corresponding to each AP in the downlink coordinated transmission set.

The AP transmits downlink CSI corresponding to the downlink coordinated transmission set as received to the server. The server determines coordinated information according to the downlink CSI corresponding to the downlink coordinated transmission set, and transmits the coordinated information to the downlink coordinated transmission set. The downlink coordinated transmission set performs downlink coordinated transmission to the STA according to the coordinated information. The STA receives data transmitted by the downlink coordinated transmission set through downlink coordinated transmission according to the coordinated information.

Optionally, the uplink preamble training sequence is a newly-added precoding symbol, where the newly-added precoding symbol is used for CSI measurement.

Optionally, the uplink quality information includes an uplink LQI, and the uplink LQI is determined by the AP through an ED algorithm.

Optionally, the uplink quality information includes uplink CSI, and the uplink CSI is determined by the AP through a CSI detection algorithm.

It should be understood that, in embodiments of the present disclosure, interactions among an AP, a server and an STA described at an AP side as well as related performance and functions thereof are corresponding to that described at an STA side, which will not be repeated herein for the sake of simplicity.

Thus, according to the method used for coordinated transmission in embodiments of the present disclosure, coordinated transmission among multiple APs can be realized by means of transmitting an uplink preamble training sequence for determining uplink quality information to an AP, and transmitting downlink CSI corresponding to a downlink coordinated transmission set to a first AP in the downlink coordinated transmission set, and thus data throughput can be improved.

Figure 15:
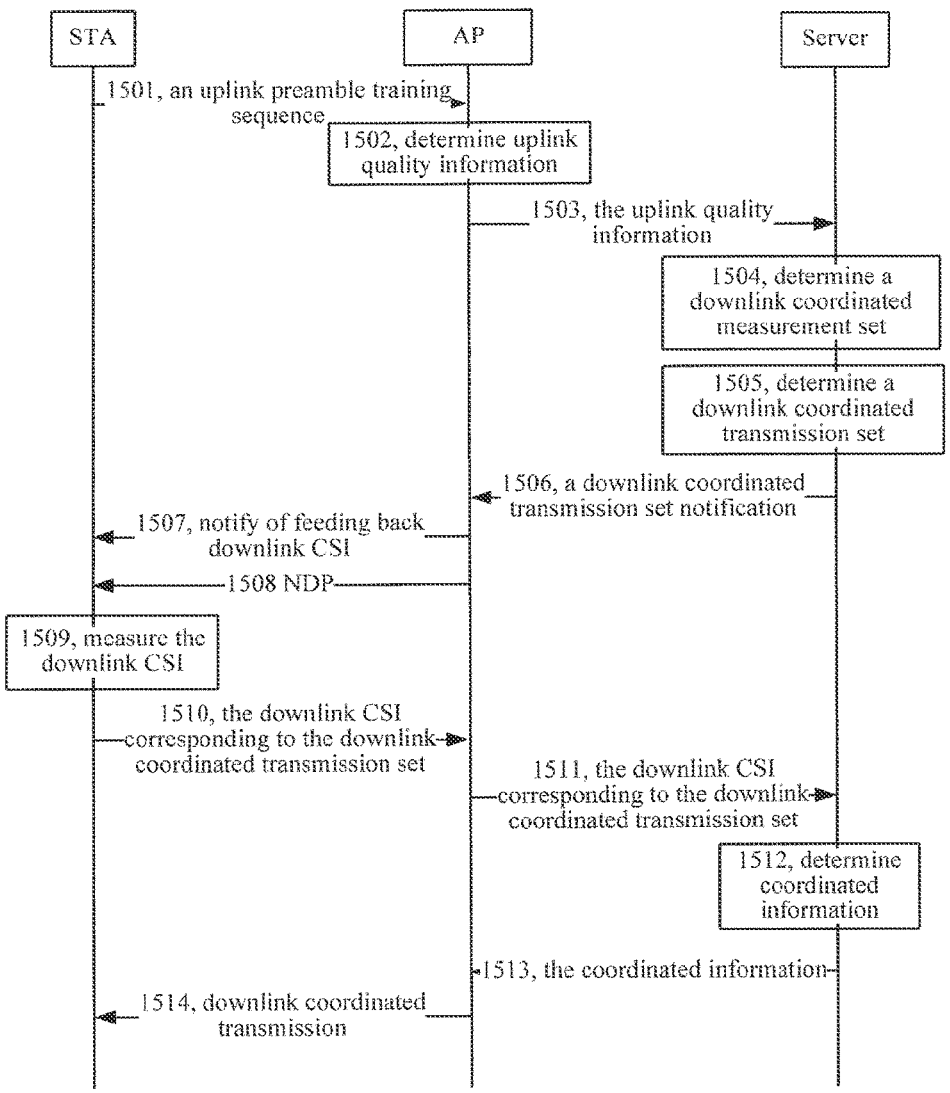
FIG. 15 is an interaction diagram of a method used for coordinated transmission according to an embodiment of the present disclosure.

The embodiments of the present disclosure will be described in detail hereunder with reference to specific examples as shown in FIG. 15. It should be understood that, this is only intended for helping persons skilled in the art better understand embodiments of the present disclosure, rather than limiting the scope of embodiments of the present disclosure.

1501, an STA transmits an uplink preamble training sequence to all APs nearby.

The uplink preamble training sequence may be a newly-added precoding symbol, such as a VVHT-LTF-CSI field as shown in FIG. 3A and FIG. 3B, and may also be a preamble training sequence in an existing standard, such as an L-STF field and an L-LTF field as shown in FIG. 4.

1502, an AP determines uplink quality information according to the uplink preamble training sequence.

The uplink quality information includes an uplink LQI and/or uplink CSI, the AP determines the uplink LQI through an ED algorithm, and determines the uplink CSI through a CSI detection algorithm.

1503, the AP transmits the uplink quality information to a server.

1504, the server determines a downlink coordinated measurement set according to the uplink quality information.

The server selects an AP having a high uplink LQI or high uplink CSI as the downlink coordinated measurement set according to reciprocity between uplink and downlink.

1505, the server determines a downlink coordinated transmission set from the downlink coordinated measurement set.

The server further selects an AP having a high uplink LQI or high uplink CSI from the downlink coordinated measurement set as the downlink coordinated transmission set.

1506, the server transmits a downlink coordinated transmission set notification message to the downlink coordinated transmission set.

1507, the AP notifies the STA of feeding back downlink CSI.

The AP in the downlink coordinated transmission set transmits a downlink signaling to notify the STA of feeding back downlink CSI.

1508, the AP transmits an NDP to the STA.

The AP in the downlink coordinated transmission set transmits an NDP to the STA, where the NDP carries information indicating that a feedback type is coordinated transmission, a feedback type may be indicated by means of two bits reserved in a Sounding Dialog Token field of an NDP frame format, or, a feedback type may also be indicated by means of extending an STA info field of an NDP frame format.

1509, the STA measures the downlink CSI.

The STA measures downlink CSI corresponding to each AP by detecting the NDP transmitted by the AP in the downlink coordinated transmission set, and acquires downlink CSI corresponding to the downlink coordinated transmission set.

1510, the STA transmits the downlink CSI corresponding to the downlink coordinated transmission set to the AP.

The STA transmits the downlink CSI corresponding to the downlink coordinated transmission set to an AP in the downlink coordinated transmission set, for instance, when succeeding in a competition in a CSMA/CA mechanism, the STA feeds back the downlink CSI corresponding to the downlink coordinated transmission set on its own uplink.

1511, the AP transmits the downlink CSI corresponding to the downlink coordinated transmission set to the server.

1512, the server determines coordinated information according to the downlink CSI corresponding to the downlink coordinated transmission set.

The server exchanges downlink CSI information among multiple APs, and performs joint scheduling of resources to determine coordinated information.

1513, the server transmits the coordinated information to the AP.

The server transmits the coordinated information to each AP in the downlink coordinated transmission set.

1514, the AP performs downlink coordinated transmission to the STA according to the coordinated information.

After receiving the coordinated information transmitted by the server, each AP in the downlink coordinated transmission set transmits data to the STA through the downlink coordinated transmission.

Thus, according to the method used for coordinated transmission in embodiments of the present disclosure, coordinated transmission among multiple APs can be realized by means of transmitting an uplink preamble training sequence for determining uplink quality information to an AP by an STA, and transmitting the determined uplink quality information to a server by the AP so as to determine a downlink coordinated transmission set, then performing downlink coordinated transmission by utilizing coordinated information determined by the server according to downlink CSI corresponding to the downlink coordinated transmission set, and thus data throughput can be improved.

It should be understood that, in embodiments of the present disclosure, serial numbers of the above described procedures do not mean the order of execution, the execution order of the procedures should be subject to functions and internal logic thereof, and should not limit implementations of the embodiments of the present disclosure.

A method used for coordinated transmission according to embodiments of the present disclosure is described above in detail with reference to FIG. 1-FIG. 15, and an AP, a server and an STA according to embodiments of the present disclosure will be described hereunder with reference to FIG. 16-FIG. 21.

Figure 16:
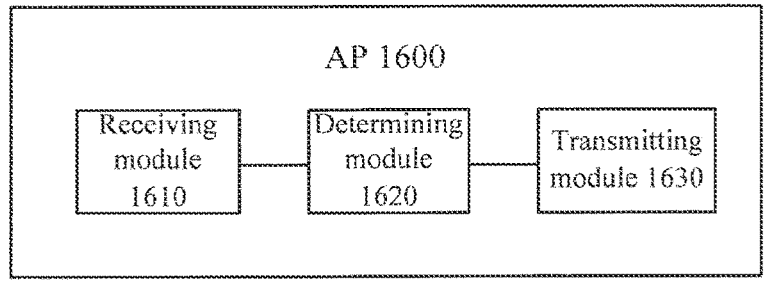
FIG. 16 is a schematic block diagram of an AP according to an embodiment of the present disclosure.

FIG. 16 shows a schematic block diagram of an AP 1600 according to an embodiment of the present disclosure. As shown in FIG. 16, the AP 1600 includes:

a receiving module 1610, configured to receive an uplink preamble training sequence transmitted by a station STA;

a determining module 1620, configured to determine uplink quality information according to the uplink preamble training sequence; and a transmitting module 1630, configured to transmit the uplink quality information to a server, to enable the server to determine a downlink coordinated transmission set according to the uplink quality information.

According to an AP in embodiments of the present disclosure, coordinated transmission among multiple APs can be realized by determining uplink quality information according to an uplink preamble training sequence transmitted by an STA and transmitting the uplink quality information to a server to enable the server to determine a downlink coordinated transmission set according to the uplink quality information, and thus data throughput can be improved.

In embodiments of the present disclosure, optionally, the receiving module 1610 is further configured to receive a downlink coordinated transmission set notification message transmitted by the server to the downlink coordinated transmission set;

the transmitting module 1630 is further configured to transmit a null data packet NDP to the STA according to the downlink coordinated transmission set notification message, where the NDP carries information indicating that a feedback type is coordinated transmission, so that the STA measures downlink channel state information CSI;

the receiving module 1610 is further configured to receive downlink CSI corresponding to the downlink coordinated transmission set transmitted by the STA;

the transmitting module 1630 is further configured to transmit the downlink CSI corresponding to the downlink coordinated transmission set to the server, to enable the server to determine coordinated information according to the downlink CSI corresponding to the downlink coordinated transmission set;

the receiving module 1610 is further configured to receive the coordinated information transmitted by the server; and the transmitting module 1630 is further configured to perform downlink coordinated transmission to the STA according to the coordinated information.

In embodiments of the present disclosure, optionally, the uplink preamble training sequence is a newly-added precoding symbol, where the newly-added precoding symbol is used for CSI measurement.

In embodiments of the present disclosure, optionally, the uplink quality information includes an uplink quality indicator LQI;

the determining module 1620 is specifically configured to determine uplink received signal strength indication RSSI of the uplink preamble training sequence through an energy detection ED algorithm, and determine the uplink LQI according to the uplink RSSI.

In embodiments of the present disclosure, optionally, the uplink quality information includes uplink CSI;

the determining module 1620 is specifically configured to determine the uplink CSI through a CSI detection algorithm.

In embodiments of the present disclosure, optionally, the receiving module 1610 is specifically configured to receive the downlink CSI corresponding to the downlink coordinated transmission set transmitted by the STA through a carrier sense/collision avoidance CSMA/CA mechanism.

The AP 1600 according to the embodiments of the present disclosure may be corresponding to an AP in the method used for coordinated transmission according to embodiments of the present disclosure, and the above described and other operations and/or functions of modules in the AP 1600 aim to implement corresponding processes of methods in FIG. 1-FIG. 15 respectively, which will not be repeated herein for the sake of simplicity.

According to an AP in embodiments of the present disclosure, coordinated transmission among multiple APs can be realized by means of transmitting to a server, uplink quality information determined according to an uplink preamble training sequence transmitted by an STA so as to determine a downlink coordinated transmission set, and then performing downlink coordinated transmission by utilizing coordinated information determined by the server according to downlink CSI corresponding to the downlink coordinated transmission set, and thus data throughput can be improved.

Figure 17:
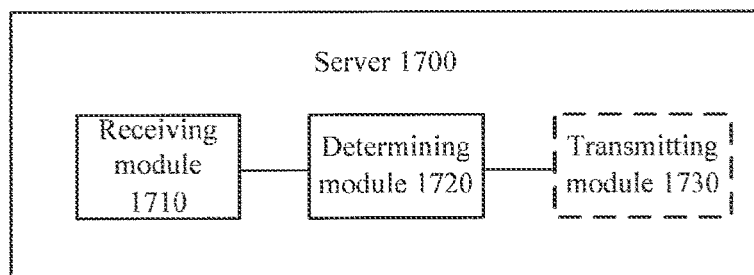
FIG. 17 is a schematic block diagram of a server according to an embodiment of the present disclosure.

FIG. 17 shows a schematic block diagram of a server 1700 according to an embodiment of the present disclosure. As shown in FIG. 17, the server 1700 includes:

a receiving module 1710, configured to receive uplink quality information transmitted by an access point AP, where, the uplink quality information is determined by the AP according to an uplink preamble training sequence transmitted by a station STA; and a determining module 1720, configured to determine a downlink coordinated transmission set according to the uplink quality information.

According to a server in embodiments of the present disclosure, coordinated transmission among multiple APs can be realized by means of determining a downlink coordinated transmission set by utilizing uplink quality information determined according to an uplink preamble training sequence transmitted by an STA, and thus data throughput can be improved.

In embodiments of the present disclosure, optionally, the uplink preamble training sequence is a newly-added precoding symbol, where the newly-added precoding symbol is used for channel state information CSI measurement.

In embodiments of the present disclosure, optionally, the determining module 1720 includes:

a first determining unit, configured to determine a downlink coordinated measurement set according to the uplink quality information; and a second determining unit, configured to determine the downlink coordinated transmission set from the downlink coordinated measurement set.

In embodiments of the present disclosure, optionally, the uplink quality information includes an uplink quality indicator LQI;

the first determining unit is specifically configured to select an AP having a high uplink LQI as the downlink coordinated measurement set; and the second determining unit is specifically configured to further select an AP having a high uplink LQI from the downlink coordinated measurement set as the downlink coordinated transmission set.

In embodiments of the present disclosure, optionally, the uplink quality information includes uplink CSI;

the first determining unit is specifically configured to select an AP having high uplink CSI as the downlink coordinated measurement set; and the second determining unit is specifically configured to further select an AP having high uplink CSI from the downlink coordinated measurement set as the downlink coordinated transmission set.

In embodiments of the present disclosure, optionally, the uplink quality information includes an uplink LQI and uplink CSI;

the first determining unit is specifically configured to select an AP having a high uplink LQI as the downlink coordinated measurement set; and the second determining unit is specifically configured to select an AP having high uplink CSI from the downlink coordinated measurement set as the downlink coordinated transmission set.

In embodiments of the present disclosure, as shown in FIG. 17, optionally, the server 1700 also includes:

a transmitting module 1730, configured to transmit a downlink coordinated transmission set notification message to the downlink coordinated transmission set;

the receiving module 1710 is further configured to receive downlink CSI corresponding to the downlink coordinated transmission set transmitted by a first AP in the downlink coordinated transmission set, where, the downlink CSI corresponding to the downlink coordinated transmission set is measured by the STA according to a null data packet NDP transmitted by each AP in the downlink coordinated transmission set, and is transmitted to the first AP;

the determining module 1720 is further configured to determine coordinated information according to the downlink CSI corresponding to the downlink coordinated transmission set; and the transmitting module 1730 is further configured to transmit the coordinated information to the downlink coordinated transmission set, to enable the downlink coordinated transmission set to perform downlink coordinated transmission to the STA according to the coordinated information.

The server 1700 according to the embodiments of the present disclosure may be corresponding to a server in the method used for coordinated transmission according to embodiments of the present disclosure, and the above described and other operations and/or functions of modules in the server 1700 aim to implement corresponding processes of methods in FIG. 1-FIG. 15 respectively, which will not be repeated herein for the sake of simplicity.

According to a server in the embodiments of the present disclosure, coordinated transmission among multiple APs can be realized by means of determining a downlink coordinated transmission set by utilizing uplink quality information determined according to an uplink preamble training sequence transmitted by an STA, and then determining coordinated information for downlink coordinated transmission according to downlink CSI corresponding to the downlink coordinated transmission set, and thus data throughput can be improved.

Figure 18:
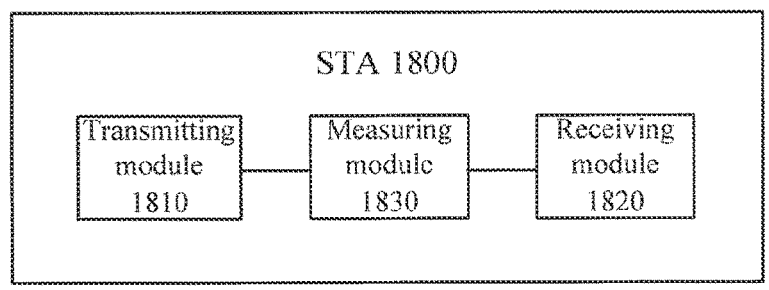
FIG. 18 is a schematic block diagram of an STA according to an embodiment of the present disclosure.

FIG. 18 shows a schematic block diagram of an STA 1800 according to an embodiment of the present disclosure. As shown in FIG. 18, the STA 1800 includes:

a transmitting module 1810, configured to transmit an uplink preamble training sequence to an access point AP, to enable the AP to determine uplink quality information according to the uplink preamble training sequence;

a receiving module 1820, configured to receive a null data packet NDP transmitted by each AP in a downlink coordinated transmission set, where the NDP carries information indicating that a feedback type is coordinated transmission, and the downlink coordinated transmission set is determined by a server according to the uplink quality information;

a measuring module 1830, configured to measure downlink channel state information CSI according to the NDP;

the transmitting module 1810 is further configured to transmit downlink CSI corresponding to the downlink coordinated transmission set to a first AP in the downlink coordinated transmission set; and the receiving module 1820 is further configured to receive data transmitted by the downlink coordinated transmission set through downlink coordinated transmission according to coordinated information, where the coordinated information is determined by the server according to the downlink CSI corresponding to the downlink coordinated transmission set.

In the embodiments of the present disclosure, optionally, the uplink preamble training sequence is a newly-added precoding symbol, where the newly-added precoding symbol is used for CSI measurement.

In the embodiments of the present disclosure, optionally, the uplink quality information includes an uplink quality indicator LQI, and the uplink LQI is determined by the AP through an energy detection ED algorithm.

In the embodiments of the present disclosure, optionally, the uplink quality information includes uplink CSI, and the uplink CSI is determined by the AP through a CSI detection algorithm.

In the embodiments of the present disclosure, optionally, the transmitting module 1810 is specifically configured to transmit the downlink CSI corresponding to the downlink coordinated transmission set to the first AP through a carrier sense multiple access with collision avoidance CSMA/CA mechanism.

The STA 1800 according to the embodiments of the present disclosure may be corresponding to an STA in the method used for coordinated transmission according to embodiments of the present disclosure, and the above described and other operations and/or functions of modules in the STA 1800 aim to implement corresponding processes of methods in FIG. 1-FIG. 15 respectively, which will not be repeated herein for the sake of simplicity.

According to the STA in the embodiments of the present disclosure, coordinated transmission among multiple APs can be realized by means of transmitting an uplink preamble training sequence for determining uplink quality information to an AP, and transmitting downlink CSI corresponding to a downlink coordinated transmission set to a first AP in the downlink coordinated transmission set, and thus data throughput can be improved.

Figure 19:
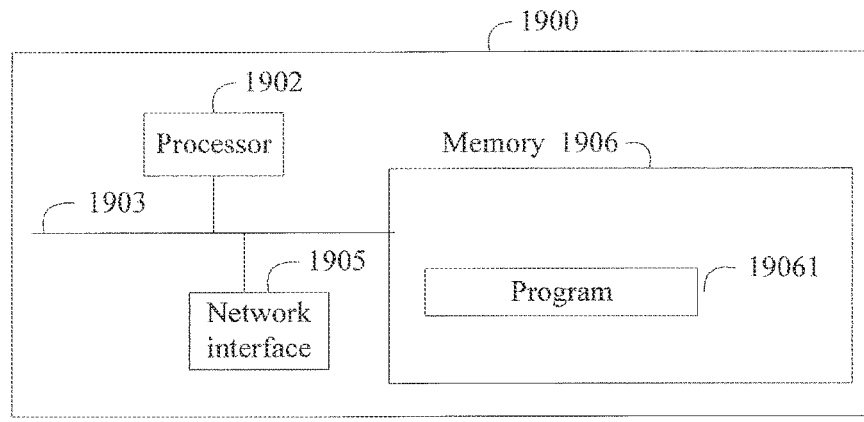
FIG. 19 is a schematic structural diagram of an AP according to an embodiment of the present disclosure.

FIG. 19 shows a structure of an AP 1900 according to another embodiment of the present disclosure, including at least one processor 1902 (such as a CPU), at least one network interface 1905 or other communication interfaces, a memory 1906, and at least one communication bus 1903 used for realizing connections and communications between the devices. The processor 1902 is configured to execute an executable module stored in the memory 1906, such as a computer program. The memory 1906 may include a high speed random access memory (RAM), and may also include a non-volatile memory, such as at least one disk memory. Communications and connections between the system gateway and at least one other network element are realized via at least one network interface 1905 (which may be wired or wireless), and an internet, a wide area network, a local network and a metropolitan area network may be used.

In some implementations, the memory 1906 is stored with a program 19061, the program 19061 may be executed by the processor 1902, and this program includes:

An access point AP receives an uplink preamble training sequence transmitted by a station STA; the AP determines uplink quality information according to the uplink preamble training sequence; and the AP transmits the uplink quality information to a server, to enable the server to determine a downlink coordinated transmission set according to the uplink quality information.

Optionally, further including: the AP receives a downlink coordinated transmission set notification message transmitted by the server to the downlink coordinated transmission set; the AP transmits a null data packet NDP to the STA according to the downlink coordinated transmission set notification message, where the NDP carries information indicating that a feedback type is coordinated transmission, to enable the STA to measure downlink channel state information CSI; the AP receives downlink CSI corresponding to the downlink coordinated transmission set transmitted by the STA; the AP transmits the downlink CSI corresponding to the downlink coordinated transmission set to the server, to enable the server to determine coordinated information according to the downlink CSI corresponding to the downlink coordinated transmission set; the AP receives the coordinated information transmitted by the server; and the AP performs downlink coordinated transmission to the STA according to the coordinated information.

Optionally, the uplink preamble training sequence is a newly-added precoding symbol, where the newly-added precoding symbol is used for CSI measurement.

Optionally, the uplink quality information includes an uplink quality indicator LQI; the AP determines the uplink quality information according to the uplink preamble training sequence, including: the AP determines uplink received signal strength indication RSSI of the uplink preamble training sequence through an energy detection ED algorithm, and determines the uplink LQI according to the uplink RSSI.

Optionally, the uplink quality information includes uplink CSI; the AP determines the uplink quality information according to the uplink preamble training sequence, including: the AP determines the uplink CSI through a CSI detection algorithm.

Optionally, the AP receives the downlink CSI corresponding to the downlink coordinated transmission set transmitted by the STA, including: the AP receives the downlink CSI corresponding to the downlink coordinated transmission set transmitted by the STA through a carrier sense/collision avoidance CSMA/CA mechanism.

It can be seen from the above technical solutions provided in embodiments of the present disclosure that, by means of determining uplink quality information according to an uplink preamble training sequence transmitted by an STA and transmitting the uplink quality information to a server to enable the server to determine a downlink coordinated transmission set according to the uplink quality information, embodiments of the present disclosure can realize coordinated transmission among multiple APs, and thus data throughput can be improved.

Figure 20:
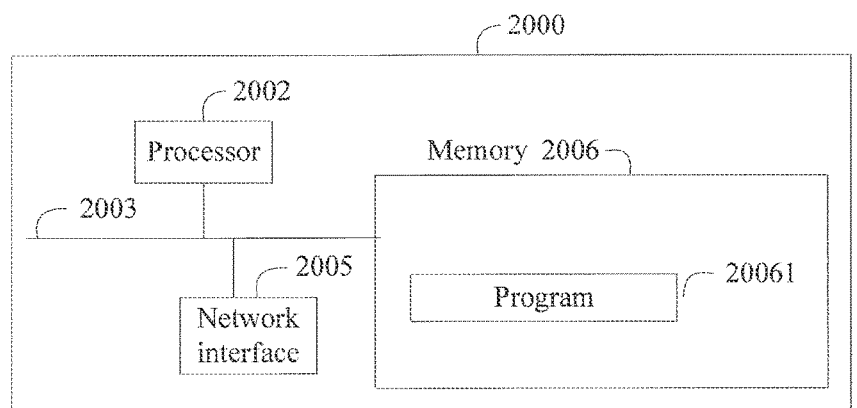
FIG. 20 is a schematic structural diagram of a server according to an embodiment of the present disclosure.

FIG. 20 shows a structure of a server 2000 according to another embodiment of the present disclosure, including at least one processor 2002 (such as a CPU), at least one network interface 2005 or other communication interfaces, a memory 2006, and at least one communication bus 2003 used for realizing connections and communications between the devices. The processor 2002 is configured to execute an executable module stored in the memory 2006, such as a computer program. The memory 2006 may include a high speed random access memory (RAM), and may also include a non-volatile memory, such as at least one disk memory. Communications and connections between the system gateway and at least one other network element are realized via at least one network interface 2005 (which may be wired or wireless), and an internet, a wide area network, a local network and a metropolitan area network may be used.

In some implementations, the memory 2006 is stored with a program 20061, the program 20061 may be executed by the processor 2002, and this program includes:

A server receives uplink quality information transmitted by an access point AP, where, the uplink quality information is determined by the AP according to an uplink preamble training sequence transmitted by a station STA; and the server determines a downlink coordinated transmission set according to the uplink quality information.

Optionally, the uplink preamble training sequence is a newly-added precoding symbol, where the newly-added precoding symbol is used for channel state information CSI measurement.

Optionally, the server determines the downlink coordinated transmission set according to the uplink quality information, including: the server determines a downlink coordinated measurement set according to the uplink quality information; and the server determines the downlink coordinated transmission set from the downlink coordinated measurement set.

Optionally, the uplink quality information includes an uplink quality indicator LQI; the server determines the downlink coordinated measurement set according to the uplink quality information, including: the server selects an AP having a high uplink LQI as the downlink coordinated measurement set; the server determines the downlink coordinated transmission set from the downlink coordinated measurement set, including: the server further selects an AP having a high uplink LQI from the downlink coordinated measurement set as the downlink coordinated transmission set.

Optionally, the uplink quality information includes uplink CSI; the server determines the downlink coordinated measurement set according to the uplink quality information, including: the server selects an AP having high uplink CSI as the downlink coordinated measurement set; the server determines the downlink coordinated transmission set from the downlink coordinated measurement set, including: the server further selects an AP having high uplink CSI from the downlink coordinated measurement set as the downlink coordinated transmission set.

Optionally, the uplink quality information includes an uplink LQI and uplink CSI; the server determines the downlink coordinated measurement set according to the uplink quality information, including: the server selects an AP having a high uplink LQI as the downlink coordinated measurement set; the server determines the downlink coordinated transmission set from the downlink coordinated measurement set, including: the server selects an AP having high uplink CSI from the downlink coordinated measurement set as the downlink coordinated transmission set.

Optionally, further including: the server transmits a downlink coordinated transmission set notification message to the downlink coordinated transmission set; the server receives downlink CSI corresponding to the downlink coordinated transmission set transmitted by a first AP in the downlink coordinated transmission set, where, the downlink CSI corresponding to the downlink coordinated transmission set is measured by the STA according to a null data packet NDP transmitted by each AP in the downlink coordinated transmission set, and is transmitted to the first AP; the server determines coordinated information according to the downlink CSI corresponding to the downlink coordinated transmission set; and the server transmits the coordinated information to the downlink coordinated transmission set, to enable the downlink coordinated transmission set to perform downlink coordinated transmission to the STA according to the coordinated information.

It can be seen from the above technical solutions provided in embodiments of the present disclosure that, coordinated transmission among multiple APs can be realized in the embodiments of the present disclosure by means of determining a downlink coordinated transmission set by utilizing uplink quality information determined according to an uplink preamble training sequence transmitted by an STA, and thus data throughput can be improved.

Figure 21:
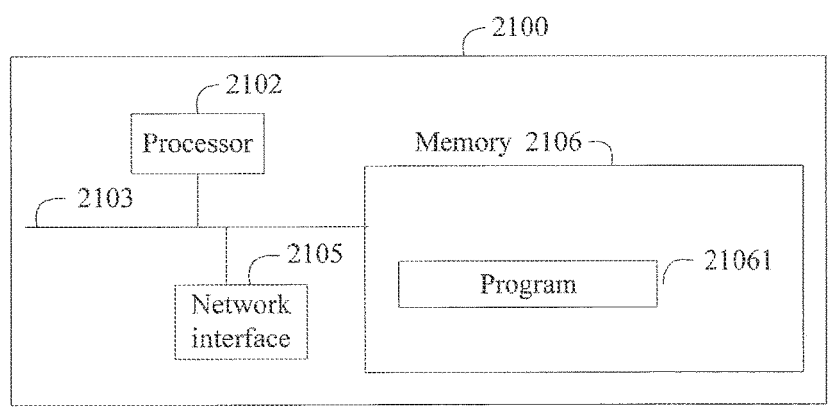
FIG. 21 is a schematic structural diagram of an STA according to an embodiment of the present disclosure.

FIG. 21 shows a structure of an STA 2100 according to another embodiment of the present disclosure, including at least one processor 2102 (such as a CPU), at least one network interface 2105 or other communication interfaces, a memory 2106, and at least one communication bus 2103 used for realizing connections and communications between the devices. The processor 2102 is configured to execute an executable module stored in the memory 2106, such as a computer program. The memory 2106 may include a high speed random access memory (RAM), and may also include a non-volatile memory, such as at least one disk memory. Communications and connections between the system gateway and at least one other network element are realized via at least one network interface 2105 (which may be wired or wireless), and an internet, a wide area network, a local network and a metropolitan area network may be used.

In some implementations, the memory 2106 is stored with a program 21061, the program 21061 may be executed by the processor 2102, and this program includes:

A station STA transmits an uplink preamble training sequence to an access point AP, to enable the AP to determine uplink quality information according to the uplink preamble training sequence; the STA receives a null data packet NDP transmitted by each AP in a downlink coordinated transmission set, where the NDP carries information indicating that a feedback type is coordinated transmission, and the downlink coordinated transmission set is determined by a server according to the uplink quality information; the STA measures downlink channel state information CSI according to the NDP; the STA transmits downlink CSI corresponding to the downlink coordinated transmission set to a first AP in the downlink coordinated transmission set; and the STA receives data transmitted by the downlink coordinated transmission set through downlink coordinated transmission according to coordinated information, where the coordinated information is determined by the server according to the downlink CSI corresponding to the downlink coordinated transmission set.

Optionally, the uplink preamble training sequence is a newly-added precoding symbol, where the newly-added precoding symbol is used for CSI measurement.

Optionally, the uplink quality information includes an uplink quality indicator LQI, and the uplink LQI is determined by the AP through an energy detection ED algorithm.

Optionally, the uplink quality information includes uplink CSI, and the uplink CSI is determined by the AP through a CSI detection algorithm.

Optionally, the STA transmits the downlink CSI corresponding to the downlink coordinated transmission set to the first AP in the downlink coordinated transmission set, including: the STA transmits the downlink CSI corresponding to the downlink coordinated transmission set to the first AP through a carrier sense/collision avoidance CSMA/CA mechanism.

It can be seen from the above technical solutions provided in embodiments of the present disclosure that, coordinated transmission among multiple APs can be realized in the embodiments of the present disclosure by means of transmitting an uplink preamble training sequence for determining uplink quality information to an AP, and transmitting downlink CSI corresponding to a downlink coordinated transmission set to a first AP in the downlink coordinated transmission set, and thus data throughput can be improved.

It should be understood that, in embodiments of the present disclosure, the term "and/or" is only an association relationship for describing associated objects, and indicates that three relationships may exist. For example, A and/or B may indicate the following three cases: only A exists, both A and B exist, and only B exists. In addition, the character "/" in this document usually indicates that the former and later associated objects are in an "or" relationship.

A person of ordinary skill in the art may realize that, units and algorithm steps of examples described with reference to embodiments disclosed herein may be implemented by electronic hardware, computer software, or a combination thereof. In order to clearly describe interchangeability between the hardware and the software, compositions and steps of the examples have been generally described according to functions in the foregoing description. Whether the functions are executed by hardware or software depends on particular applications and design constraint conditions of the technical solutions. A person skilled in the art may use different methods to implement the described functions for each particular application, but such implementation should not be conceived as going beyond the scope of the present disclosure.

A person skilled in the art may clearly know that, for the purpose of convenient and brief description, reference may be made to corresponding processes in the foregoing method embodiments for a detailed working process of the above described system, apparatus and unit, which will be not repeated herein.

In several embodiments provided in the present application, it should be understood that the disclosed system, apparatus, and method may be implemented in other manners. For example, the described apparatus embodiments are merely illustrative. For example, the dividing of the units is merely a kind of logical function dividing, and there may be other dividing manners during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between apparatuses or units may be electronic, mechanical, or in other forms.

The units described as separate parts may or may not be physically separate, and parts displayed as units may or may not be physical units, that is, may be located in one position, or may be distributed on multiple network units. Part or all of the units may be selected according to actual needs to achieve objectives of the solutions of the embodiments of the present disclosure.

In addition, functional units in the embodiments of the present disclosure may be integrated into a processing unit, or each of the units may also exist alone physically, or two or more than two units may also be integrated into one unit. The above integrated unit may be implemented in a form of hardware, and may also be implemented in a form of a software functional unit.

If the integrated unit is implemented in the form of a software functional unit and sold or used as an independent product, the integrated unit may be stored in a computer readable storage medium. Based on such understanding, the technical solutions of the present disclosure essentially, or the part contributing to the prior art, or all or part of the technical solutions may be implemented in the form of a software product. The computer software product is stored in a storage medium and includes several instructions for instructing a computer device (which may be a personal computer, a server, a network device, or the like) to execute all or part of steps of the method described in the embodiments of the present disclosure. The storage medium includes: any medium capable of storing program codes, such as a USB flash disk, a mobile hard disk, a read-only memory (ROM), a random access memory (RAM), a magnetic disk, or an optical disk.

The foregoing description is merely specific embodiments of the present disclosure, but the protection scope of the present disclosure is not limited thereto. A person skilled in the art may readily envisage of equivalent modifications or replacements within the technical scope disclosed in the present disclosure, and these modifications or replacements shall fall into the protection scope of the present disclosure. Therefore, the protection scope of the present disclosure shall be subject to the protection scope of the appended claims.

What is claimed is:

1. A method for coordinated transmission, comprising:
receiving, by an access point (AP), an uplink preamble training sequence transmitted by a station (STA);
determining, by the AP, uplink quality information according to the uplink preamble training sequence;
transmitting, by the AP, the uplink quality information to a server, to enable the server to determine a downlink coordinated transmission set according to the uplink quality information;
receiving, by the AP, a downlink coordinated transmission set notification message transmitted by the server to the downlink coordinated transmission set;
transmitting, by the AP, a null data packet (NDP) to the STA according to the downlink coordinated transmission set notification message, wherein the NDP carries information indicating that a feedback type is coordinated transmission, to enable the STA to measure downlink channel state information (CSI);
receiving, by the AP, downlink CSI corresponding to the downlink coordinated transmission set transmitted by the STA;
transmitting, by the AP, the downlink CSI corresponding to the downlink coordinated transmission set to the server, to enable the server to determine coordinated information according to the downlink CSI corresponding to the downlink coordinated transmission set;
receiving, by the AP, the coordinated information transmitted by the server; and
performing, by the AP, downlink coordinated transmission to the STA according to the coordinated information;
wherein the uplink preamble training sequence comprises at least one of:
a newly-added precoded symbol, wherein the newly-added precoded symbol is used for CSI measurement; and
a legacy short training field (L-STF) and a legacy long training field (L-LTF), wherein the L-STF and the L-LTF are used for CSI measurement.

2. The method according to claim 1, wherein the uplink quality information comprises an uplink quality indicator (LQI), and the determining, by the AP, the uplink quality information according to the uplink preamble training sequence comprises:
determining, by the AP, uplink received signal strength indication (RSSI) of the uplink preamble training sequence through an energy detection (ED) algorithm; and
determining the uplink LQI according to the uplink RSSI.

3. The method according to claim 1, wherein the uplink quality information comprises uplink CSI, and the determining, by the AP, the uplink quality information according to the uplink preamble training sequence comprises:
determining, by the AP, the uplink CSI through a CSI detection algorithm.

4. A method for coordinated transmission, comprising:
receiving, by a server, uplink quality information transmitted by an access point (AP), wherein the uplink quality information is determined by the AP according to an uplink preamble training sequence transmitted by a station (STA);
determining, by the server, a downlink coordinated transmission set according to the uplink quality information; and
transmitting, by the server, a downlink coordinated transmission set notification message to the AP, so that the AP transmits a null data packet (NDP) to the STA according to the downlink coordinated transmission set notification message, wherein the NDP carries information indicating that a feedback type is coordinated transmission, to enable the STA to measure downlink channel state information (CSI) and enable the STA to transmit downlink CSI corresponding to the downlink coordinated transmission set to the AP;
receiving, by the server, the downlink CSI corresponding to the downlink coordinated transmission set from the AP;
determining, by the server, coordinated information according to the downlink CSI corresponding to the downlink coordinated transmission set that is transmitted to the server by the AP:
transmitting, by the server, the coordinated information to the AP, to enable the AP to perform downlink coordinated transmission to the STA according to the coordinated information;
wherein the uplink preamble training sequence comprises at least one of:
a newly-added precoded symbol, wherein the newly-added precoded symbol is used for CSI measurement; and
a legacy short training field (L-STF) and a legacy long training field (L-LTF), wherein the L-STF and the L-LTF are used for CSI measurement.

5. The method according to claim 4, wherein the determining, by the server, the downlink coordinated transmission set according to the uplink quality information comprises:
determining, by the server, a downlink coordinated measurement set according to the uplink quality information; and
determining, by the server, the downlink coordinated transmission set from the downlink coordinated measurement set.

6. A method for coordinated transmission, comprising:
transmitting, by a station (STA), an uplink preamble training sequence to an access point (AP), to enable the AP to determine uplink quality information according to the uplink preamble training sequence and to enable the AP to transmit the uplink quality information to a server, which enables the server to determine a downlink coordinated transmission set according to the uplink quality information;

receiving, by the STA, a null data packet (NDP) transmitted by the AP in a downlink coordinated transmission set according to a downlink coordinated transmission set notification message received by the AP from the server, wherein the downlink coordinated transmission set notification message is transmitted by the server to the AP in the downlink coordinated transmission set, and wherein the NDP carries information indicating that a feedback type is coordinated transmission, and the downlink coordinated transmission set is determined by the server according to the uplink quality information;

measuring, by the STA, downlink channel state information (CSI) according to the NDP;

transmitting, by the STA, downlink CSI corresponding to the downlink coordinated transmission set to the AP in the downlink coordinated transmission set to enable the AP to transmit the downlink CSI to the server, which enables the server to determine coordinated information according to the downlink CSI corresponding to the downlink coordinated transmission set; and receiving, by the STA from the AP, data transmitted by the downlink coordinated transmission set through downlink coordinated transmission according to the coordinated information determined by the server according to the downlink CSI corresponding to the downlink coordinated transmission set;

wherein the uplink preamble training sequence comprises at least one of:
a newly-added precoded symbol, wherein the newly-added precoded symbol is used for CSI measurement; and
a legacy short training field (L-STF) and a legacy long training field (L-LTF), wherein the L-STF and the L-LTF are used for CSI measurement.

7. The method according to claim 6, wherein the uplink quality information comprises an uplink quality indicator (LQI), and the uplink LQI is determined by the AP through an energy detection (ED) algorithm.

8. An access point (AP), comprising:
a non-transitory processor-readable medium storing instructions; and
a processor configured to execute the instructions to cause the AP to:
receive an uplink preamble training sequence transmitted by a station (STA);
determine uplink quality information according to the uplink preamble training sequence;
transmit the uplink quality information to a server, to enable the server to determine a downlink coordinated transmission set according to the uplink quality information;
receive a downlink coordinated transmission set notification message transmitted by the server to the downlink coordinated transmission set;
transmit a null data packet (NDP) to the STA according to the downlink coordinated transmission set notification message, wherein the NDP carries information indicating that a feedback type is coordinated transmission, to enable the STA to measure downlink channel state information (CSI);
receive downlink CSI corresponding to the downlink coordinated transmission set transmitted by the STA;
transmit the downlink CSI corresponding to the downlink coordinated transmission set to the server, to enable the server to determine coordinated information according to the downlink CSI corresponding to the downlink coordinated transmission set;
receive the coordinated information transmitted by the server; and
perform downlink coordinated transmission to the STA according to the coordinated information;
wherein the uplink preamble training sequence comprises at least one of:
a newly-added precoded symbol, wherein the newly-added precoded symbol is used for CSI measurement; and
a legacy short training field (L-STF) and a legacy long training field (L-LTF), wherein the L-STF and the L-LTF are used for CSI measurement.

9. The AP according to claim 8, wherein the uplink quality information comprises an uplink quality indicator (LQI), and the determining the uplink quality information according to the uplink preamble training sequence comprises:
determining uplink received signal strength indication (RSSI) of the uplink preamble training sequence through an energy detection (ED) algorithm; and
determining the uplink LQI according to the uplink RSSI.

10. The AP according to claim 8, wherein the uplink quality information comprises uplink CSI, and the determining the uplink quality information according to the uplink preamble training sequence comprises:
determining the uplink CSI through a CSI detection algorithm.

11. A server, comprising:
a non-transitory processor-readable medium storing instructions; and
a processor configured to execute the instructions to cause the server to:
receive uplink quality information transmitted by an access point (AP), wherein the uplink quality information is determined by the AP according to an uplink preamble training sequence transmitted by a station (STA);
determine a downlink coordinated transmission set according to the uplink quality information;
transmit a downlink coordinated transmission set notification message to the AP, so that the AP transmits a null data packet (NDP) to the STA according to the downlink coordinated transmission set notification message, wherein the NDP carries information indicating that a feedback type is coordinated transmission, to enable the STA to measure downlink channel state information (CSI) and enable the STA to transmit downlink CSI corresponding to the downlink coordinated transmission set to the AP;
receive the downlink CSI corresponding to the downlink coordinated transmission set from the AP;
determine coordinated information according to the downlink CSI corresponding to the downlink coordinated transmission set that is transmitted to the server by the AP; and
transmit the coordinated information to the AP, to enable the AP to perform downlink coordinated transmission to the STA according to the coordinated information;
wherein the uplink preamble training sequence comprises at least one of:

a newly-added precoded symbol, wherein the newly-added precoded symbol is used for CSI measurement; and
a legacy short training field (L-STF) and a legacy long training field (L-LTF), wherein the L-STF and the L-LTF are used for CSI measurement.

12. The server according to claim 11, wherein the server is further configured to:
determine a downlink coordinated measurement set according to the uplink quality information; and
determine the downlink coordinated transmission set from the downlink coordinated measurement set.

13. A station (STA), comprising:
a non-transitory processor-readable medium storing instructions; and
a processor configured to execute the instructions to cause the STA to:
transmit an uplink preamble training sequence to an access point (AP), to enable the AP to determine uplink quality information according to the uplink preamble training sequence and to enable the AP to transmit the uplink quality information to a server, which enables the server to determine a downlink coordinated transmission set according to the uplink quality information;
receive a null data packet (NDP) transmitted by the AP in a downlink coordinated transmission set according to a downlink coordinated transmission set notification message received by the AP from the server, wherein the downlink coordinated transmission set notification message is transmitted by the server to the AP in the downlink coordinated transmission set, and wherein the NDP carries information indicating that a feedback type is coordinated transmission, and the downlink coordinated transmission set is determined by a server according to the uplink quality information;
measure downlink channel state information (CSI) according to the NDP;
transmit downlink CSI corresponding to the downlink coordinated transmission set to the AP in the downlink coordinated transmission set to enable the AP to transmit the downlink CSI to the server, which enables the server to determine coordinated information according to the downlink CSI corresponding to the downlink coordinated transmission set; and
receive, from the AP, data transmitted by the downlink coordinated transmission set through downlink coordinated transmission according to the coordinated information determined by the server according to the downlink CSI corresponding to the downlink coordinated transmission set;
wherein the uplink preamble training sequence comprises at least one of:
a newly-added precoded symbol, wherein the newly-added precoded symbol is used for CSI measurement; and
a legacy short training field (L-STF) and a legacy long training field (L-LTF), wherein the L-STF and the L-LTF are used for CSI measurement.

14. The STA according to claim 13, wherein the uplink quality information comprises an uplink quality indicator (LQI), and the uplink LQI is determined by the AP through an energy detection (ED) algorithm.

* * * * *